US011939856B2

(12) United States Patent
Doughty et al.

(10) Patent No.: US 11,939,856 B2
(45) Date of Patent: Mar. 26, 2024

(54) OPERATING WELLBORE EQUIPMENT USING DATA FROM MEDIATOR COMPUTING DEVICES

(71) Applicant: Halliburton Energy Services, Inc., Houston, TX (US)

(72) Inventors: Clinton Michael Doughty, Spring, TX (US); Nathan Patrick Leach, Houston, TX (US); Tatyana Kostyanovskaya, Houston, TX (US); Kevin James Brammer, Manvel, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 94 days.

(21) Appl. No.: 17/299,020

(22) PCT Filed: Jan. 24, 2019

(86) PCT No.: PCT/US2019/014943
§ 371 (c)(1),
(2) Date: Jun. 2, 2021

(87) PCT Pub. No.: WO2020/153960
PCT Pub. Date: Jul. 30, 2020

(65) Prior Publication Data
US 2022/0042410 A1 Feb. 10, 2022

(51) Int. Cl.
*E21B 43/26* (2006.01)
*E21B 44/00* (2006.01)
(Continued)

(52) U.S. Cl.
CPC .............. *E21B 44/00* (2013.01); *E21B 43/26* (2013.01); *E21B 49/00* (2013.01); *G01V 1/288* (2013.01)

(58) Field of Classification Search
CPC .......... E21B 43/26; E21B 44/00; E21B 47/14; E21B 49/00; E21B 2200/20; E21B 2200/22; G01V 1/28; G01V 1/288
See application file for complete search history.

(56) References Cited

U.S. PATENT DOCUMENTS 7,983,885 B2 * 7/2011 Suarez-Rivera ......... G01V 1/50
702/6
8,121,971 B2 * 2/2012 Edwards ................. E21B 44/00
706/50

(Continued)

FOREIGN PATENT DOCUMENTS

| CN | 106878171 | 6/2017 |
| EP | 2377031 | 10/2011 |
| WO | 2014031186 | 2/2014 |

OTHER PUBLICATIONS

International Application No. PCT/US2019/014943, International Search Report and Written Opinion, dated Oct. 23, 2019, 10 pages.

*Primary Examiner* — Kenneth L Thompson
(74) *Attorney, Agent, or Firm* — Kilpatrick Townsend & Stockton LLP

(57) ABSTRACT

A system includes a first wellbore operation controller for controlling a wellbore operation and generating a first broadcast indicating a first data topic desired for controlling the wellbore operation. The system also includes a second wellbore operation controller for generating a data stream associated with a wellbore and for generating a second broadcast indicating a second data topic that promotes the data stream. The system includes a mediator computing device that receives the first broadcast and the second broadcast and determines that the first wellbore operation controller is subscribed to the data stream by comparing the first data topic to the second data topic. In response to determining that the first wellbore operation controller is (Continued)

subscribed to the data stream, the mediator computing device creates a data link between the first wellbore operation controller and the second wellbore operation controller.

13 Claims, 12 Drawing Sheets

(51) Int. Cl.
*E21B 49/00* (2006.01)
*G01V 1/28* (2006.01)

(56) References Cited

U.S. PATENT DOCUMENTS

| | | |
|---|---|---|
| 8,359,347 B2 | 1/2013 | Branson et al. |
| 9,022,140 B2* | 5/2015 | Marx ................ E21B 47/00 |
| | | 175/50 |
| 10,788,407 B2* | 9/2020 | Nazari ................ E21B 47/07 |
| 11,021,949 B2* | 6/2021 | Davila ................ E21B 44/00 |
| 11,530,600 B2* | 12/2022 | Mustapha ............ G06F 30/28 |
| 2003/0038734 A1 | 2/2003 | Hirsch et al. |
| 2011/0120702 A1 | 5/2011 | Craig |
| 2011/0188347 A1* | 8/2011 | Thiercelin ............ G01V 1/288 |
| | | 367/69 |
| 2012/0274664 A1 | 11/2012 | Fagnou |
| 2015/0057933 A1 | 2/2015 | Ma et al. |
| 2022/0155480 A1* | 5/2022 | Mishra ................ G01V 1/282 |

* cited by examiner

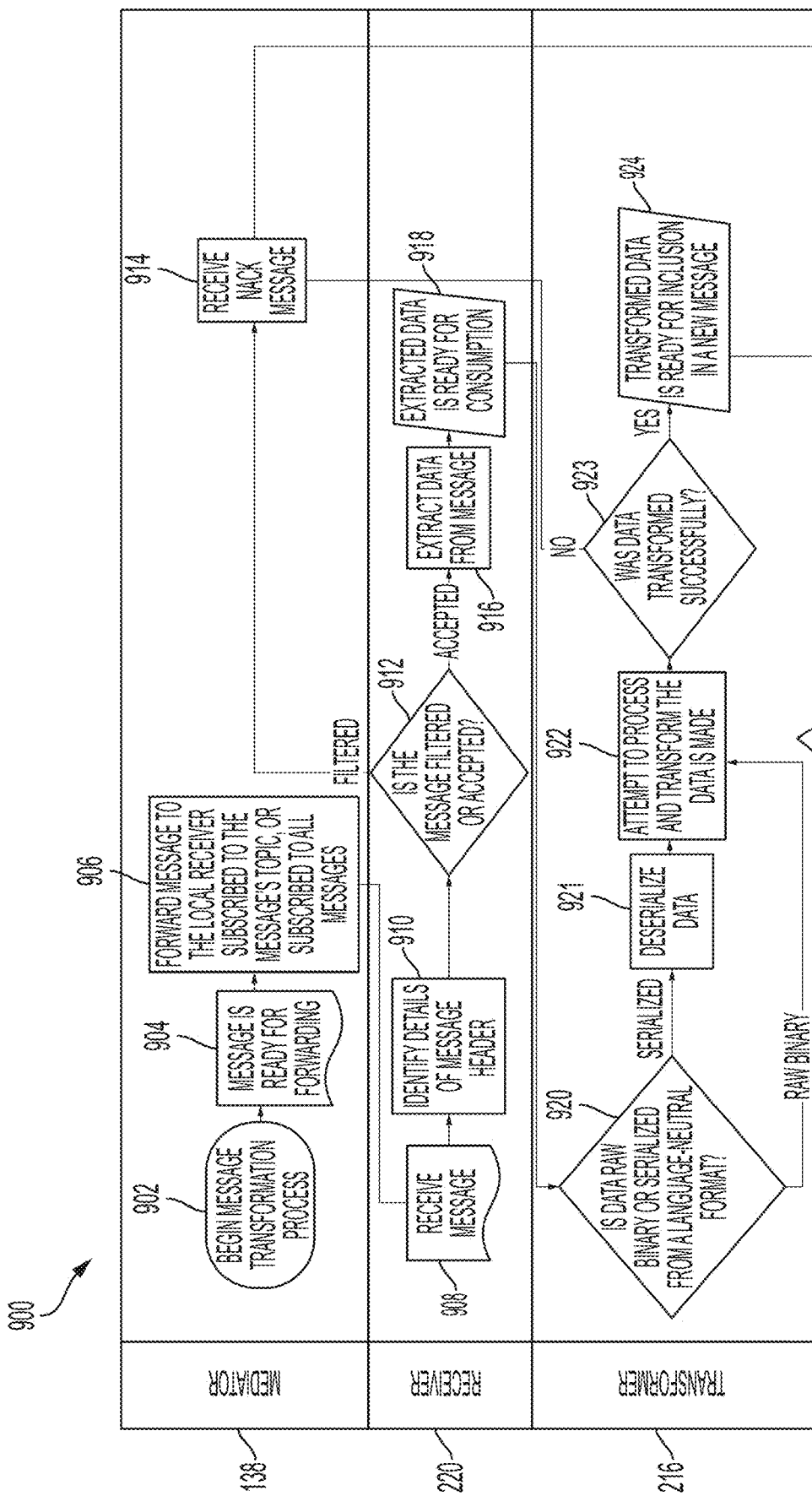

OPERATING WELLBORE EQUIPMENT USING DATA FROM MEDIATOR COMPUTING DEVICES

TECHNICAL FIELD

The present disclosure relates generally to devices for use in well systems. More specifically, but not by way of limitation, this disclosure relates to control of equipment used for well completion, well maintenance, and hydrocarbon production using data acquired from mediator computing devices.

BACKGROUND

A well system (e.g., an oil or gas well system) may include a wellbore drilled through a subterranean formation. The subterranean formation may include a rock matrix permeated by oil or gas that is to be extracted using the well system. Control of equipment used in wellbore operations, such as wellbore completion, well maintenance, and hydrocarbon production, is often provided by software tools that operate using algorithmic processes to estimate control settings of the equipment to achieve equipment efficiency. Controlling the equipment using the algorithmic processes results in a system that relies on an incomplete and potentially inaccurate representations of the well system and reservoir. Such reliance on incomplete representations may hinder performance of the equipment.

The software tools may rely on the algorithmic processes in isolation from other processes or data. That is, the software tools generate the control settings of the equipment based on data obtained by tools at a drilling site, but the software tools fail to utilize data generated by other tools or equipment. Moreover, the algorithmic processes fail to update based on other processes operating simultaneously or in conjunction with the algorithmic processes during the wellbore operation. Accordingly, the equipment control based on the isolated algorithmic processes relies on incomplete representations of the wellbore operation.

DETAILED DESCRIPTION

Figure 1:
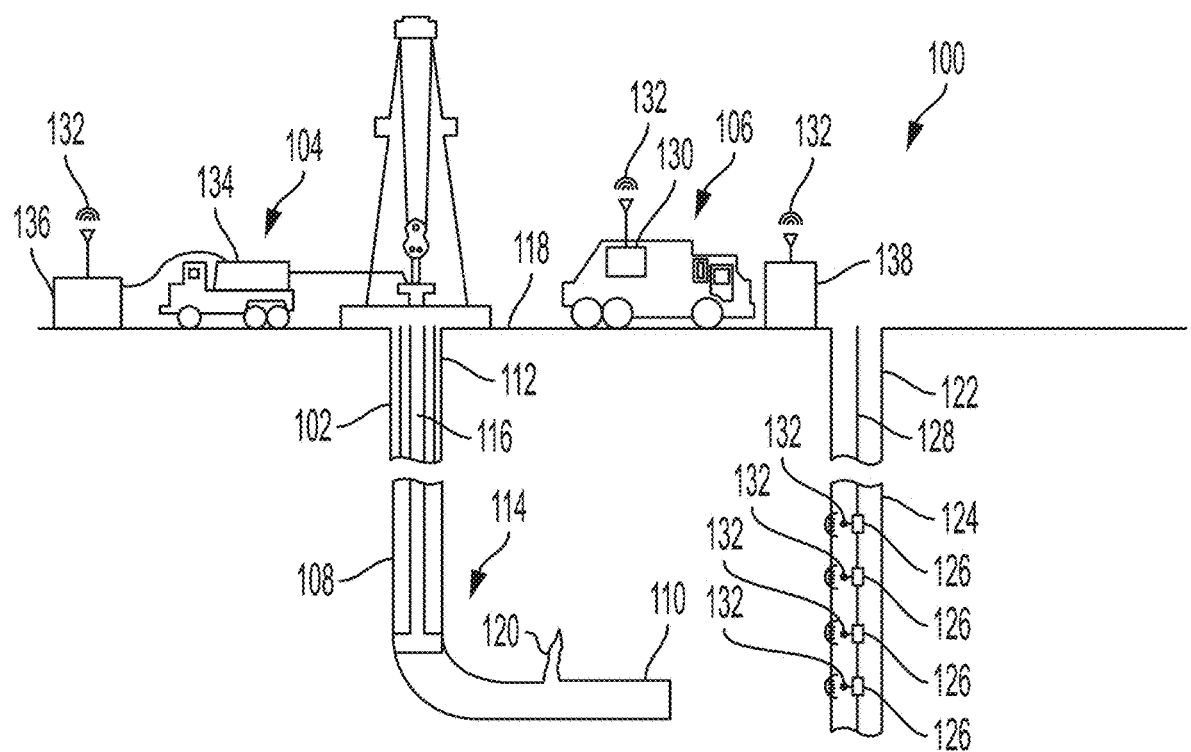
FIG. 1 is a schematic illustration of wellbore, a pumping system, and a microseismic monitoring system according to some aspects.

Certain aspects and features of the present disclosure relate to using data streams from wellbore creation, treatment, or production operations using a mediator computing device to generate equipment control parameter values. Sensors disposed within the wellbore that area associated with varying operations within the wellbore may be capable of detecting geological, geographical, and wellbore environmental attributes to generate equipment control parameter values. Separate wellbore creation, treatment, or production operations may generate data streams on separate computing systems at a wellsite. These separate computing systems may leverage information detected by other computing systems to enhance performance associated with the individual computing systems controlling the wellbore operations by creating data links between the separate computing systems using the mediator computing device (e.g., a framework of data stream sharing).

A method and system according to some examples can offer a framework of data stream sharing between separate wellbore operation controllers using a multiple domain data environment. The framework may enable an individual wellbore operation controller to broadcast data streams generated by a wellbore operation (e.g., wellbore creation, treatment, or production operations) of the individual wellbore operation controller, and for the individual wellbore operation controller to receive data streams generated by additional wellbore operations of additional wellbore operation controllers. In this manner, individual wellbore operation controllers are able to incorporate relevant data streams from other wellbore operation controllers to control the wellbore operations of the individual wellbore operation controllers.

By providing the framework to multiple wellbore operation controllers, additional wellbore operation controllers may arrive at a wellsite and "plug in" to relevant data streams already being generated by the multiple wellbore operation controllers. Upon plugging in the additional wellbore operation controllers, two-way communication between the newly plugged in wellbore operation controllers and prior established wellbore operation controllers may commence. This may enable the wellbore operation controllers to receive data feedback loops where actions in one wellbore operation domain (e.g., pumping) are combined with observations in another wellbore operation domain (e.g., microseismic monitoring). These feedback loops may result in changes to parameters in one of the wellbore operation domains. For example, a parameter of a pumping operation may change in response to observations from a microseismic monitoring operation.

Illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a schematic illustration of a wellbore environment 100 including wellbore 102, a pumping system 104, and a microseismic monitoring system 106. The wellbore 102 extends through various earth strata. The wellbore 102 has a substantially vertical section 108 and a substantially horizontal section 110. The substantially vertical section 108 may include a casing string 112 cemented at an upper portion of the substantially vertical section 108. The substantially horizontal section 110 extends through a hydrocarbon bearing subterranean formation 114. A tubing string 116 extends from the surface 118 into the wellbore 102. The tubing string 116 can provide a conduit for pumping a fracturing fluid into the wellbore 102 from the pumping system 104 to perform hydraulic fracturing operations on the wellbore 102. The wellbore 102 includes a hydraulic fracture 120 (or induced fracture) that extends from the substantially horizontal section 110. Proppant materials can be entrained in the fracturing fluid at the pumping system 104 and deposited in the hydraulic fracture 120 to maintain the hydraulic fracture 120 in an open state.

The wellbore environment 100 can include an observation wellbore 122 extending through various earth strata. The observation wellbore 122 has a substantially vertical section 124. One or more geophones 126 are positioned on a tool 128 deployed within the observation wellbore 122. In some aspects, transducers, tiltmeters or other suitable sensors may be used in place of the geophones 126. The geophones 126 can monitor microseismic events in the formation 114. For example, the geophones 126 can detect the arrival of primary waves and secondary waves of a microseismic event in the formation 114 during a hydraulic fracturing operation. In some aspects, tiltmeters may be positioned at the surface 118 proximate the horizontal location of the hydraulic fracture 120 or in shallow holes at the surface 118.

The geophones 126 can be communicatively coupled to a computing device 130 (i.e., a wellbore operation controller). The computing device 130 can be positioned at the surface 118 or at a separate location. In some aspects, the tiltmeters can be communicatively coupled to the computing device 130 and can transmit data sufficient to determine a location of a microseismic event in the formation 114.

The computing device 130 can include a processor interfaced with other hardware via a bus. A memory, which can include any suitable tangible (and non-transitory) computer-readable medium, such as random-access memory ("RAM"), ROM, electrically erasable and programmable read-only memory ("EEPROM"), or the like, can embody program components that configure operation of the computing device 130. In some aspects, the computing device 130 can include input/output interface components (e.g., a display, keyboard, touch-sensitive surface, and mouse) and additional storage. The computing device 130 can transmit data to and receive data from the geophones 126 via a communication link 132 between the computing device 130 and the geophones 126. The communication link 132 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In other aspects, the communication link 132 can be wired and can include interfaces such as Ethernet, USB, IEEE 1394, or a fiber optic interface. While the computing device 130 is depicted as forming a part of a vehicle, the computing device 130 may also be located remotely from the vehicle as a stand-alone element.

The computing device 130 can use the data received from the array of geophones 126 to determine microseismic monitoring results, for example a location of a microseismic event that occurs in the formation 114 during the hydraulic fracturing operation. In an example, the computing device 130 can receive from the geophones 126 raw signal data corresponding to the arrival times of the primary waves and secondary waves associated with the microseismic event. The computing device 130 can calculate the difference between the travel times of the primary waves and secondary waves using data associated with the formation 114 to determine the location of the microseismic event. The computing device 130 can determine the length (hereinafter "observed length") of the hydraulic fracture 120 based on the location of the microseismic event. For example, the computing device can determine an observed length of the hydraulic fracture 120 based on the location of the microseismic event and the assumption that the event occurred at the tip of a hydraulic fracture with a growing length.

The computing device 130 can also determine an estimated or a predicted length of the hydraulic fracture 120 (hereinafter "predicted length") based on a fracture model. In some aspects, the computing device 130 can determine a predicted height or other geometry of the hydraulic fracture based on the fracture model. The fracture model can be updated using microseismic monitoring results determined by the computing device 130 using the data received from the array of geophones 126. Other characteristics of the hydraulic fracture 120 may also be calculated by the computing device 130 using the data received by the array of geophones 126.

The wellbore environment 100 may also include the pumping system 104 including a pumping truck 134 or other pumping device, fracturing fluid storage tanks (not shown), and any other components or systems associated with a hydraulic fracturing or stimulation operation performed by the pumping system 104. A pumping computing device 136 (i.e., an additional wellbore operation controller) may control operations of the pumping system 104. The pumping computing device 136 can control an injection flow rate of the fracturing fluid that is introduced into the formation 114 during a hydraulic fracturing operation.

The pumping computing device 136 can include a processor interfaced with other hardware via a bus. A memory, which can include any suitable tangible (and non-transitory) computer-readable medium, such as random-access memory ("RAM"), ROM, electrically erasable and programmable read-only memory ("EEPROM"), or the like, can embody program components that configure operation of the pumping computing device 136. In some aspects, the pumping computing device 136 can include input/output interface components (e.g., a display, keyboard, touch-sensitive surface, and mouse) and additional storage.

The pumping computing device 136 can transmit data to and receive data from a mediator computing device 138 via a communication link 132 between the pumping computing device 136 and the mediator computing device 138. The communication link 132 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In other aspects, the communication link 132 can be wired and can include interfaces such as Ethernet, USB, IEEE 1394, or a fiber optic interface. While the pumping computing device 136 is depicted as separate from other components of the pumping system 104, the pumping computing device 136 may also be integral with another component of the pumping system 104. For example, the pumping computing device 136 may form a part of pumping truck 134.

The computing device 130 can also transmit data to and receive data from a mediator computing device 138 via a communication link 132 between the computing device 130 and the mediator computing device 138. Other devices producing data, consuming data, or both (e.g., other wellbore operation controllers) may also communicate with the mediator computing device 138 using the communication link 132. During operation, the computing device 130, the pumping computing device 136, or any other wellbore operation controllers may receive data streams from the mediator computing device 138 using the communication link 132.

The mediator computing device 138 can include a processor interfaced with other hardware via a bus. A memory, which can include any suitable tangible (and non-transitory) computer-readable medium, such as random-access memory ("RAM"), ROM, electrically erasable and programmable read-only memory ("EEPROM"), or the like, can embody program components that configure operation of the mediator computing device 138. In some aspects, the mediator computing device 138 can include input/output interface components (e.g., a display, keyboard, touch-sensitive surface, and mouse) and additional storage. The mediator computing device 138 can transmit data to and receive data from wellbore operation controllers via a communication link 132 between the mediator computing device 138 and the wellbore operation controllers. The communication link 132 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In other aspects, the communication link 132 can be wired and can include interfaces such as Ethernet, USB, IEEE 1394, or a fiber optic interface. While the mediator computing device 138 is depicted as separate from other components of the wellbore environment 100, the mediator computing device 138 may also be integral with any another components of the wellbore environment 100.

The data streams received at the computing device 130, the pumping computing device 136, or any other wellbore operation controllers from the mediator computing device 138 may provide additional data in a usable form to the computing device 130, the pumping computing device 136, or any other wellbore operation controllers. For example, the data streams from the computing device 130 and the pumping computing device 136 may be transformed by the mediator computing device 138 to a format understood by other wellbore operation controllers also linked with the mediator computing device 138. Thus, the mediator computing device 138 may be able to receive data in one format, transform the data to a common format, and provide the common format data to a number of wellbore operation controllers in communication with the mediator computing device 138.

In communicating with the mediator computing device 138, each wellbore operation controller (e.g., the computing device 130 and the pumping computing device 136) may provide broadcasts to the mediator computing device 138. The broadcasts provided to the mediator computing device 138 may provide an indication of a type of data each of the wellbore operation controllers are capable of channeling through the mediator computing device 138. That is, the broadcasts may indicate that the wellbore operation controller is a data stream and a type of data that the wellbore operation controller is capable of streaming. Additionally, the broadcasts may include an indication of a type of data each of the wellbore operation controllers would like to receive from other wellbore operation controllers through the mediator computing device 136. That is, the broadcasts may indicate that the wellbore operation controller is a data consumer and a type of data that the wellbore operation controller would like to receive.

In an example, the mediator computing device 138 may control visibility and access to data streams that are received by the mediator computing device 138. For example, the mediator computing device 138 may secure the data streams such that only wellbore operation controllers privy to a password are able to access the streams. Additionally, the mediator computing device 138 may provide certain data streams to only a subset of wellbore operation controllers in communication with the mediator computing device 138. Further, the data sources (e.g., the wellbore operation controllers generating the data streams) may control visibility and access to the data streams by providing instructions to the mediator computing device 138.

In some examples, certain data may be available to wellbore operation controllers associated with a specific company in communication with the mediator computing device 138 that may not be available to wellbore operation controllers associated with a different company also in communication with the mediator computing device 138. Moreover, each of the wellbore operation controllers in communication with the mediator computing device 138 may be able to assign trust values to data streams received from the mediator computing device 138. For example, a model used by the pumping computing device 136 may assign greater weight to a data stream originating from the computing device 130 when the microseismic monitoring system 106 is associated with the same company as the pumping computing device 136 as opposed to the microseismic monitoring system 106 being associated with a competitor company that is also working at a wellsite.

Further, the mediator computing device 138 may perform transformation operations on data streams received from the wellbore operation controllers. For example, each of the wellbore operation controllers may generate the data streams in a format specific to a type or manufacturer of the wellbore operation controller. The mediator computing device 138 may receive the data streams in such a format, and transform the data streams into a higher level domain concept than the raw data. For example, the mediator computing device 138 may transform raw data associated with pumping pressure from the pumping system 104 into a numerical representation of the pumping pressure that is supported by the other wellbore operation controllers in communication with the mediator computing device 138. The consumers of the data (i.e., the other wellbore operation controllers) may receive the data stream either in raw form (e.g., when the other wellbore operation controllers support such a format) or at the higher level domain concept.

Moreover, multiple levels of domain concept extraction may be provided before the data is shared as a source or sent to a destination wellbore operation controller by the mediator computing device 138. For example, pumping pressure, temperature, and audio data may be combined by the mediator computing device 138 to form a pumping effectiveness layer. The pumping effectiveness layer may then be shared by the mediator computing device 138 to other wellbore operation controllers.

In an example, the mediator computing device 138 may include a stack data structure that includes basic program components that are similar across sources and destinations that operate on the same program stack. A base stack of the stack data structure may support pluggable components that add functionality. For example, the functionality of the pluggable components may include additions of protocols, supported destinations, protocol interpretation, data storage persistence calculations, other types of data analysis, transformation, or logic, or a combination thereof. Each of the pluggable components added to the mediator computing device 138 may be updated without recompiling the base stack of the stack data structure.

The mediator computing device 138 may also provide process management functionalities. For example, pluggable components may react to data emitted by other pluggable components running in the stack data structure and emit the reactions as data for other pluggable components to consume. Additionally, one or more pluggable components operating in the stack data structure may emit data that is not presently consumed by the other pluggable components operating in the stack data structure, but may be consumed by pluggable components installed at a future time. In this manner, changing pluggable components operating in the stack data structure, and changing the data streams that are provided or consumed by the pluggable components, may change the capabilities of the wellbore operation controllers operating in the wellbore environment 100.

As mentioned above, the mediator computing device 138 communicates with the wellbore operation controllers and any other pluggable components through the links 132. The wellbore operation controllers and other pluggable components that operate on different stacks (e.g., through a different mediator computing device) may be linked at the mediator computing device 138 through an automated handshake process resulting from identifying the wellbore operation controllers and other pluggable components as data sources and data destinations. The linking may be achieved through a generic component at the mediator computing device 138 that reads all available emitted data, applies filtering to the available emitted data based on access definitions for availability of the data, and forwards the data to a remote system (e.g., through a remote mediator computing device). The remote system then emits the received data into the local stack of the remote system such that pluggable components on the local stack have access to the received data.

In an example, the mediator computing device 138 may include any computing device capable of running a computing platform that provides a mechanism to broadcast data stream availability. Other computing devices that are not the mediator computing device 138 may interface with the mediator computing device 138. For example, the other computing devices that do not function as the mediator computing device 138 may include a computing component of a sensor (e.g., the computing device 130 associated with the geophones 126). Such a sensor may include its own computing device with a well-defined interface on how to obtain streams of data. In such an example, a sender, which operates on the mediator computing device 138, can receive data from that sensor in a pull or push format supported by that sensor. The sender may convert the data to a programming language-neutral format (if beneficial), package the data into a platform message wrapper, and send the packaged data to the mediator computing device 138. The sensor data can be processed by data receivers in communication with the mediator computing device 138, or the sensor data can be forwarded to remote mediator computing devices that are linked to the mediator computing device 138 for a topic of the data.

Other computing devices not running the computing platform that provides the mechanism to broadcast the data stream availability may include a database server that stores incoming data. In such an example, the database on the computing device may have a well-defined interface that allows data to be inserted for storage. In this example, a receiver in communication with the mediator computing device 138 may receive data from the mediator computing device, and the receiver can process the data by storing it onto the database server using the well-defined interface of the database server. In either of these examples, the computing platform run by the mediator computing device 138 may facilitate an easily extendible and distributable real-time bus for harvesting and processing the data from external computing devices that do not include the computing platform run by the mediator computing device 138.

Figure 2:
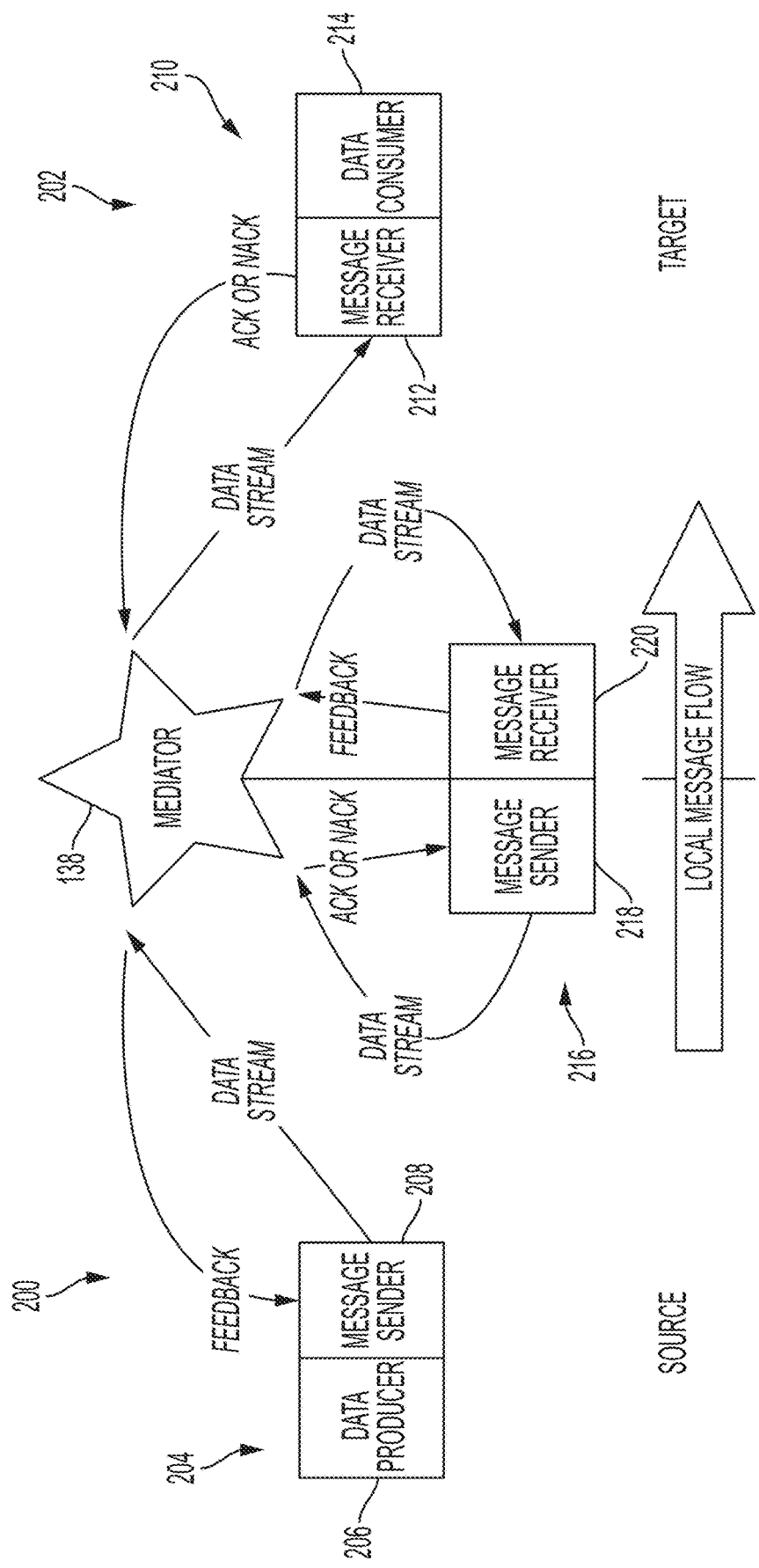
FIG. 2 is a schematic diagram of a flow of data across a mediator computing device according to some aspects.

FIG. 2 is a schematic diagram of a flow of data across the mediator computing device 138. A data source side 200 may provide a data stream to a mediator computing device 138, and a data consuming side 202 may receive the data stream from the mediator computing device 138. In an example, the data source side 200 includes a wellbore operation controller 204 (e.g., the microseismic monitoring system 106 of FIG. 1) that generates a data stream with a data producer component 206 and sends the data stream to the mediator computing device 138 with a message sender component 208. Additionally, the message sender component 208 of the wellbore operation controller 204 may receive feedback from the mediator computing device 138 indicating potential issues with the data stream or additional data that other wellbore operation controllers desire that the wellbore operation controller 204 may be able to generate.

Other examples of the wellbore operation controller 204 are user interface programs, data acquisition programs that read data from a physical device, math calculation programs, programs that react to receiving data from another source, or a combination thereof. The mediator computing device 138 may receive messages from any number of wellbore operation controllers 204 that generate data to allow any number of wellbore operation controllers 210 on the data consuming side 202 to receive the data streams and react to the data contained in the data streams. Further, with the wellbore operation controller 204 is described as a data producer and the wellbore operation controller 210 is described as a data consumer, both the wellbore operation controllers 204 and 210 may operate as both data producers and data consumers in one or more examples.

In an example, the data consuming side 202 includes the wellbore operation controller 210 (e.g., the pumping system 104 of FIG. 1) that receives a data stream from the mediator computing device 138 with a message receiver component 212 and consumes the data stream with a data consumer component 214. Upon receipt of the data stream from the mediator computing device 138, the message receiver component 212 may provide to the mediator computing device 138 an acknowledgement of successful receipt of the data stream or a non-acknowledgment indicating that the data stream was not received successfully. Other examples of the wellbore operation controller 204 are user interface programs, data acquisition programs that read data from a physical device, math calculation programs, programs that react to receiving data from another source, or a combination thereof. The mediator computing device 138 may provide data streams to any number of wellbore operation controllers 210 that consume data generated by any number of wellbore operation controllers 204.

In an example, an additional wellbore operation controller 216 may include both a message sender component 218 and a message receiver component 220. The wellbore operation controller 216 may receive the data stream from the mediator computing device 138 and provide feedback associated with the data stream to the mediator computing device 138 from the message receiver component 220. Additionally, the wellbore operation controller 216 may execute a set of instructions on the data from the data stream, and provide a new data stream to the mediator computing device 138 from the message sender component 218. The new data stream provided by the message sender component 218 may then be received and consumed by any other consuming wellbore operation controllers in communication with the mediator computing device 138.

The mediator computing device 138 may function as a message agnostic message router. That is, the mediator computing device 138 provides a mechanism for the data streams from data producing wellbore operation controllers 204 and 216 to be delivered to any data consuming wellbore operation controllers 210 and 216. Further, the mediator computing device 138 identifies a format of the data streams such that the data consuming wellbore operation controllers 210 and 216 only receive data in a format that that the data consuming wellbore operation controllers 210 and 216 are capable of handling.

Figure 3:
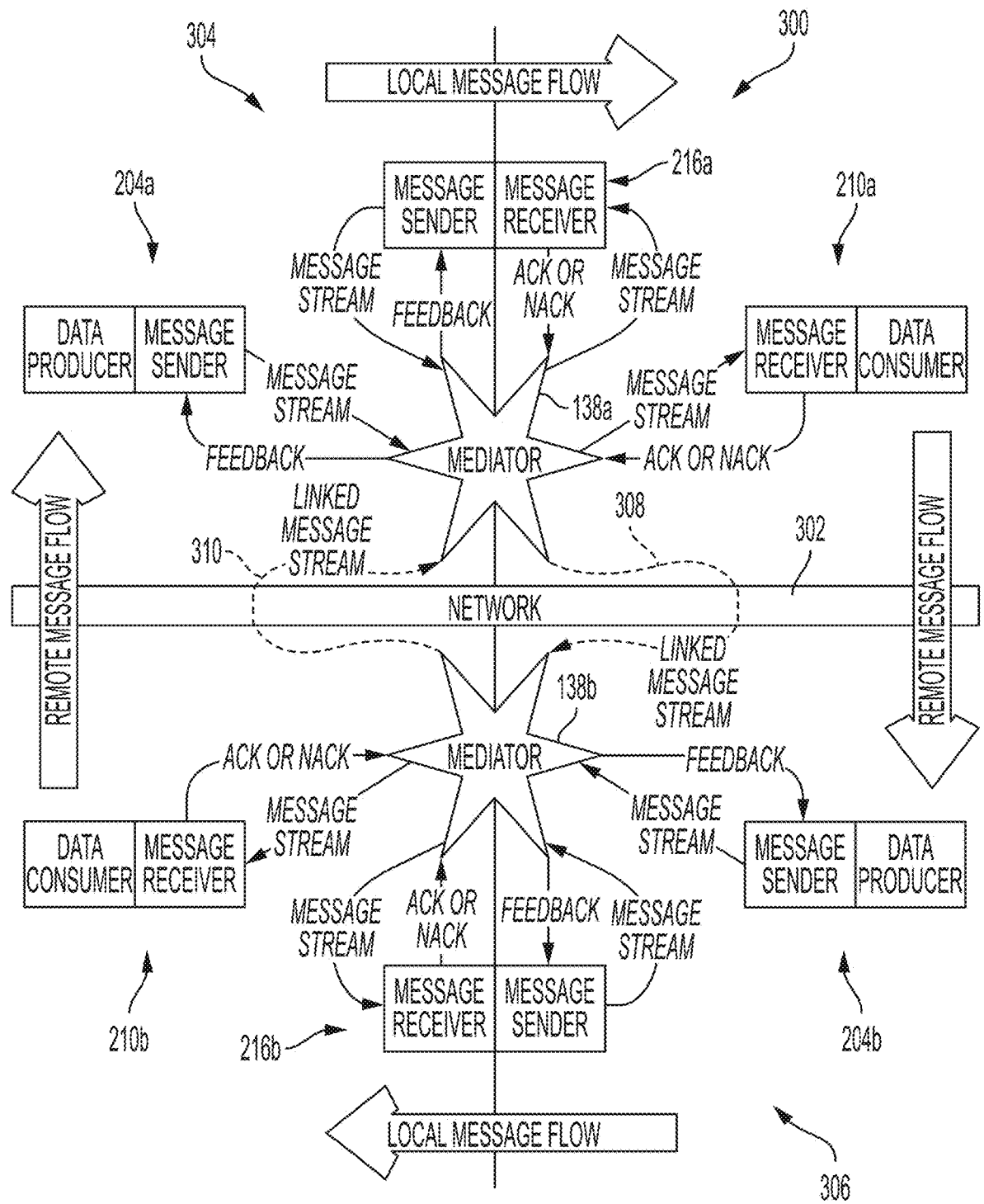
FIG. 3 is a schematic diagram of a flow of data between two mediator computing devices across a network according to some aspects.

FIG. 3 a schematic diagram of a system 300 including a flow of data between two mediator computing devices 138a and 138b across a network 302. In one or more examples, the mediator computing device 138a may be positioned within a framework 304 that is local to wellbore operation controllers 204a, 210a, and 216a, while the mediator computing device 138b may be positioned within a framework 306 that is local to wellbore operation controllers 204b, 210b, and 216b. Each of the frameworks 304 and 306 may operate in a manner similar to the mediator computing device 138 and the wellbore operation controllers 204, 210, and 216 described above with respect to FIG. 2.

The system 300 also includes the network 302 that enables a flow of data at data streams 308 and 310 between the mediator computing devices 138a and 138b. In an example, the data streams 308 and 310 provide a network link between the frameworks 304 and 306 across the network 302. In this manner, the mediator computing device 138a may be able to receive data from the wellbore operation controllers 204a, 210a, and 216a and the mediator computing device 138b, and the mediator computing device 138a may be able to distribute data to the wellbore operation controllers 204a, 210a, and 216a and the mediator computing device 138b. Likewise, the mediator computing device 138b may be able to receive data from the wellbore operation controllers 204b, 210b, and 216b and the mediator computing device 138a, and the mediator computing device 138b may be able to distribute data to the wellbore operation controllers 204b, 210b, and 216b and the mediator computing device 138a. In one or more examples, the wellbore operation controllers 204a and 204b, 210a and 210b, and 216a and 216b may assign equal weight to the data received from the respective mediator computing device 138a and 138b regardless of which of the frameworks 304 or 306 originated the data.

Figure 4:
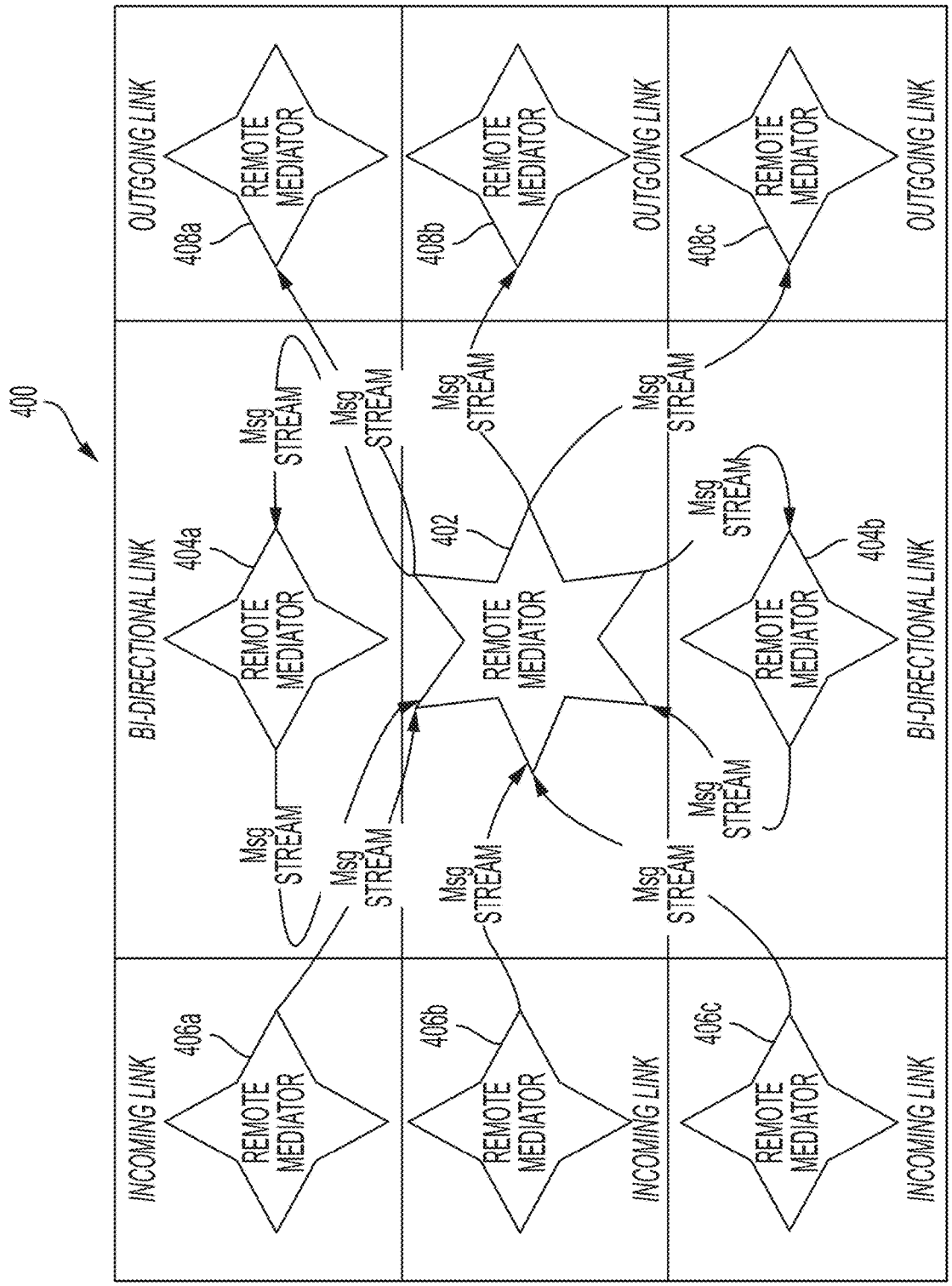
FIG. 4 is a schematic diagram of an exchange of data across several mediator computing devices according to some aspects.

FIG. 4 is a schematic diagram of a system 400 exchanging data across several mediator computing devices 402, 404a, 404b, 406a, 406b, 406c, 408a, 408b, and 408c. A local mediator computing device 402 may be a local mediator computing device operating within the same framework as one or more wellbore operation controllers 204, 210, and 216. To increase data available to the wellbore operation controllers 204, 210, and 216 in communication with the local mediator computing device 402, several links with other mediator computing devices may be established.

For example, the local mediator computing device may establish bi-directional links with bi-directional mediator computing devices 404a and 404b. The bi-directional mediator computing devices 404a and 404b may operate within frameworks remote from the local mediator computing device 402, and the bi-directional mediator computing devices 404a and 404b may receive data from wellbore operation controllers also operating within the remote frameworks from the local mediator computing device 402. The bi-directional links established between the local mediator computing device 402 and the bi-directional mediator computing devices 404a and 404b may enable transmission of data from the bi-directional mediator computing devices 404a and 404b to the local mediator computing device 402 and from the local mediator computing device 402 to the bi-directional mediator computing devices 404a and 404b.

The local mediator computing device 402 may also establish incoming links with incoming mediator computing devices 406a, 406b, and 406c. Likewise, the local mediator computing device 402 may establish outgoing links with outgoing mediator computing devices 408a, 408b, and 408c. In an example, the incoming mediator computing devices 406a, 406b, and 406c may provide data to the local mediator computing device 402 without also receiving any data from the local mediator computing device 402. Additionally, the outgoing mediator computing devices 408a, 408b, and 408c may receive data from the local mediator computing device 402 without also providing any data to the local mediator computing device 402.

While the local mediator computing device 402 is depicted as being linked to eight different remote mediator computing devices, more or fewer remote mediator computing devices may link with the local mediator computing devices 402 in other examples. Further, each of the remote mediator computing devices depicted in FIG. 4 (e.g., mediator computing devices 404a, 404b, 406a, 406b, 406c, 408a, 408b, and 408c) may each communicate with one or more of the other depicted remote mediator computing devices or with one or more remote mediator computing devices that are not depicted in FIG. 4. As each remote mediator computing device links with other remote mediator computing devices, more data may be available for the local mediator computing device 402 to leverage into information usable for control of wellbore operations.

Figure 5:
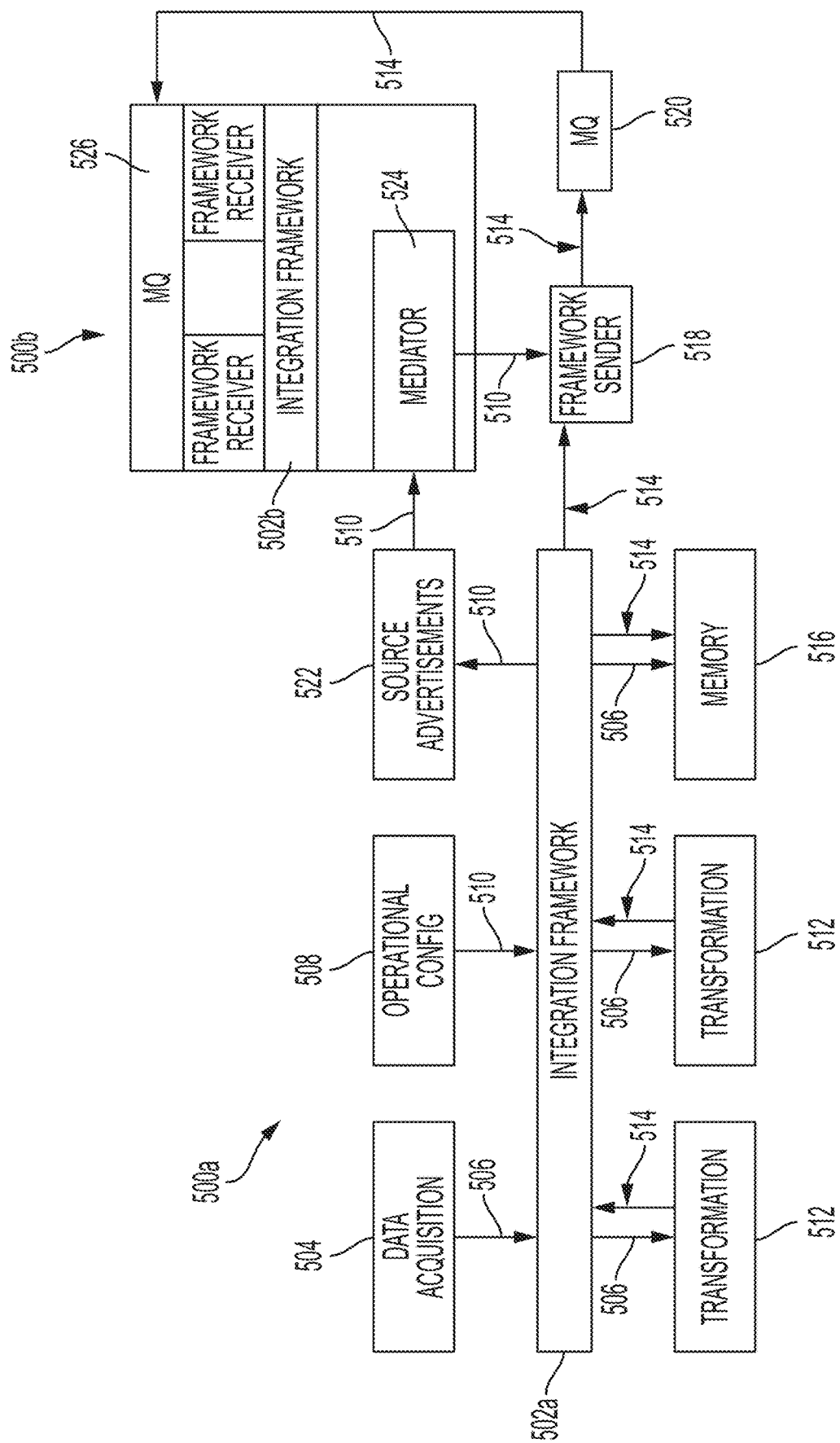
FIG. 5 is a schematic diagram of two data producers or consumers including integration frameworks according to some aspects.

FIG. 5 is a schematic diagram of two data producers or consumers 500a and 500b (e.g., the computing device 130 and the pumping computing device 136 of FIG. 1) including integration frameworks 502a and 502b. The data producer or consumer 500a may include the integration framework 502a that provides a mechanism to supply data messages to various subcomponents of the data producer or consumer 500a or to other data consumers or producers 500b. In an example, the data producer or consumer 500a includes a data acquisition component 504 that provides raw data to the integration framework 502a through a raw data connection link 506. The data producer or consumer 500a may also include an operational configuration block 508 that provides operational configuration information through a configuration data connection link 510. The operational configuration information from the operational configuration block 508 may be information from a controller of the data producer or consumer 500a that controls parameters of how the data producer or consumer 500a produces or consumes data.

Upon receipt of the raw data from the data acquisition component 504, the integration framework 502a may provide the raw data to one or more transformation components 512. The transformation components 512 may transform the raw data into one or more sets of transformed data that are usable as control inputs for wellbore operation controllers. The transformed data may be returned to the integration framework 502a using transformed data links 514. In an example, both the raw data and the transformed data may be stored locally in a memory 516 of the data producer or consumer 500a via the raw data connection link 506 and the transformed data connection link 514, respectively. Moreover, the transformed data may be provided by the integration framework 502a to a framework sender 518 using the transformed data link 514 before being transmitted to a message queue 520 via an additional transformed data link 514. At the message queue 520, the transformed data may await collection from another data producer or consumer. In an example, the transformed data may be provided to the message queue 520 when, for example, a message receiver component 212 establishes a link with the data broadcast.

To identify another data producer or consumer (e.g., the data consumer or producer 500b) that may benefit from receiving the transformed data, the integration framework 502a may provide configuration data of the data producer or consumer 500a to a source broadcasting block 522 using the configuration data connection link 510. The source broadcasting block 522 may interact with a mediator computing device 524 (e.g., the mediator computing device 138 of FIG. 1) to broadcast the type of transformed. For example, the source broadcasting block 522 may broadcast that the transformed data is microseismic acoustic data, hydraulic pumping telemetry, or other types of data. Further, the source broadcasting block 522 may broadcast information about the origination of the transformed data (e.g., a well identifiers, equipment serial numbers, probe identifiers, etc.).

The mediator computing device 524 may also provide configuration data across a configuration data connection link 510 to the framework sender 518. The configuration data provided to the configuration data connection link 510 may provide information to the framework sender 518 on how to package the transformed data for transmission to the message queue 520 such that the transformed data is in a format usable by and linked to, for example, the data consumer or producer 500b. In this manner, the transformed data may be transmitted to a message queue 526 of the data consumer or producer 500b using an additional transformed data connection link 514.

While the mediator computing device 524 is depicted as being located within the data consumer or producer 500b, the mediator computing device 524 may also be located in the data producer or consumer 500a, a standalone device, or a device located with a different non-illustrated data consumer or producer. Additionally, the mediator computing device 524 may provide and receive configuration data from a number of data consumers or producers to coordinate the transfer of data between the number of data consumers or producers.

Figure 6:
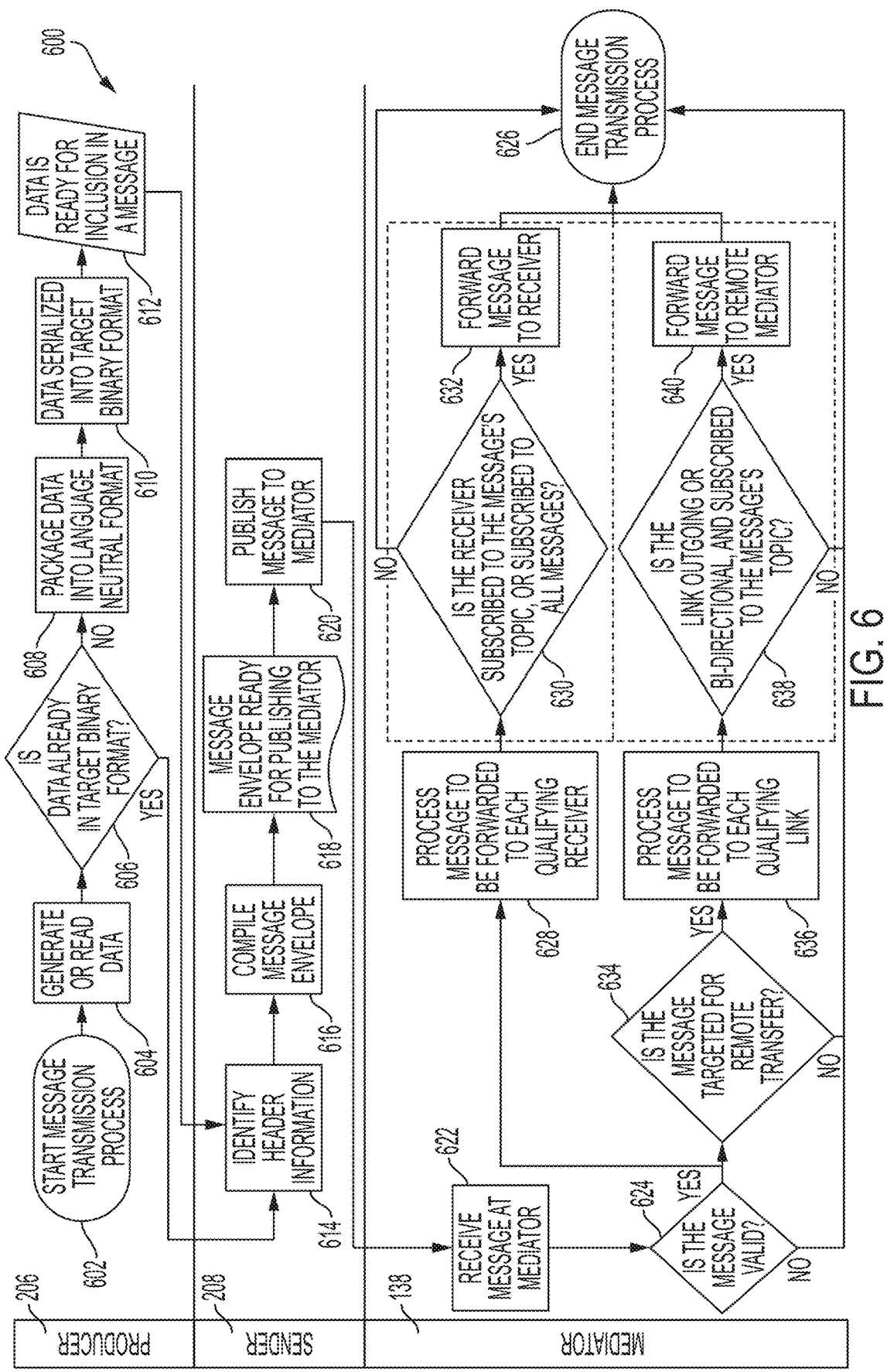
FIG. 6 is a flowchart of an example process for transmitting a message to the mediator computing device of FIG. 1 according to some aspects.

FIG. 6 is a flowchart of an example process 600 for transmitting a message to the mediator computing device 138. As discussed above, the wellbore operation controller 204 may include a data producer component 206 and a message sender component 208. These components 206 and 208 of the wellbore operation controller 204 may generate and send a stream of data to the mediator computing device 138 according to the process 600 described below.

At block 602, the process 600 involves starting the process 600. Starting the process 600 may involve a trigger. For example, the wellbore operation controller 204 may receive an indication that another wellbore operation controller is looking for the data produced or otherwise generated by the wellbore operation controller 204. In another example, the process 600 may initialize upon startup of the wellbore operation controller 204.

At block 604, the process 600 involves generating or reading data at the data producer component 206. Reading the data at the data producer component 206 may involve receiving information from sensors or other data sources communicatively coupled with or integral to the data producer component 206. Additionally, generating the data at the data producer component 206 may involve performing a transforming operation on raw data to generate a data stream that is in a format usable for wellbore operation control.

At block 606, the process 600 involves making a determination as to whether the data is in a target binary format. The target binary format may include a serialized programming language-neutral format that is readable by other devices such as the wellbore operation controllers 210 and 216 depicted in FIG. 1. If the data is already in the target binary format, the data may continue the process 600 at the message sender component 208.

If the data is not already in the target binary format, at block 608, the process 600 involves packaging the data into a programming language-neutral format. The programming language-neutral format may be used to exchange data between the wellbore operation controllers 204, 210, and 216 independent of the language that each of the wellbore operation controllers 204, 210, and 216 use for performing operations independently.

At block 610, the process 600 involves serializing the data in the programming language-neutral formal to generate the target binary format. The target binary format is used to transfer the data between the wellbore operation controllers 204, 210, and 216. Accordingly, at block 612, the data in the target binary format is ready for inclusion in a message to be transmitted to other wellbore operation controllers 204, 210, and 216.

At block 614, the process 600 involves identifying, at the message sender component 208, header information for the data in the target binary format. The header information may describe, for example, what information the data represents (e.g., microseismic acoustic data, hydraulic pumping telemetry, etc.) and the origination of the data (e.g., the well identifier, the equipment serial number, the probe identifier, etc.).

At block 616, the process 600 involves compiling a message envelope. The message envelope may include the header information combined with the data in the target binary format. Upon compiling the message envelope, the message envelope is ready, at block 618, for publishing to the mediator computing device 138. Thus, at block 620, the process 600 involves publishing the message (i.e., the message envelope) to the mediator computing device 138.

At block 622, the process 600 involves receiving the message at the mediator computing device 138. As discussed above, the mediator computing device 138 may be integral to the wellbore operation controller 204, may be located within a separate wellbore operation controller 210 or 216, or may be a standalone device. The message sender component 208 may transmit the message to the mediator computing device 138 through a wired or wireless connection.

At block 624, the process 600 involves making a determination as to whether the message is valid. For example, the mediator computing device 138 may determine that the message is somehow corrupted or is missing necessary elements for transmission of the message to the other wellbore operation controllers 210 or 216. If the message is not valid, the message transmission process ends at block 626.

If the message received by the mediator computing device 138 is valid, at block 628, the process 600 involves processing the message to be forwarded to each qualifying receiver. The qualifying receivers may be, for example, the wellbore operation controllers 210 or 216 that are subscribed to a type of data included within the message from the wellbore operation controller 204. Further, processing the message may be an indication that the message was not discarded, and the message is available for forwarding to receivers in communication with the mediator computing device 138.

At block 630, the process 600 involves determining if each of the receivers in communication with the mediator computing device 138 is subscribed to the message's topic or subscribed to all messages from the mediator computing device 138. If a receiver is not subscribed to the message's topic or to all messages from the mediator computing device 138, the process 600 may end at block 626.

If the receiver is subscribed to the message's topic or to all messages from the mediator computing device 138, at block 632, the process 600 involves forwarding the message to each of the subscribed receivers. Once the message is forwarded to the subscribed receivers, the process 600 may end at block 626.

At block 634, the process 600 involves determining if the message is targeted for remote transfer. For example, the message may be targeted for transmission to one or more remote mediator computing devices. If the message is not targeted for transfer to a remote mediator computing device, the process 600 may end at block 626.

If the message is targeted for transfer to a remote mediator computing device, at block 636, the process 600 involves processing the message to be forwarded to each qualifying link to other remote mediator computing devices. The remote mediator computing devices receiving the message may be, for example, the remote mediator computing devices in communication with remote wellbore controllers that are subscribed to a type of data included within the message from the wellbore operation controller 204. Further, processing the message may be an indication that the message was not discarded, and the message is available for forwarding to remote mediator computing devices subscribed to the topic of the message.

At block 638, the process 600 involves determining if the link is outgoing or bi-directional and subscribed to the message's topic. If the link is not outgoing or bi-directional or not subscribed to the message's topic, the process 600 may end at block 626. If the link is outgoing or bi-directional and subscribed to the message's topic, at block 640, the message is forwarded using each of the qualifying links to the remote mediator computing devices. Upon completion of forwarding the message to the qualifying links, the process 600 may end at block 626.

Figure 7:
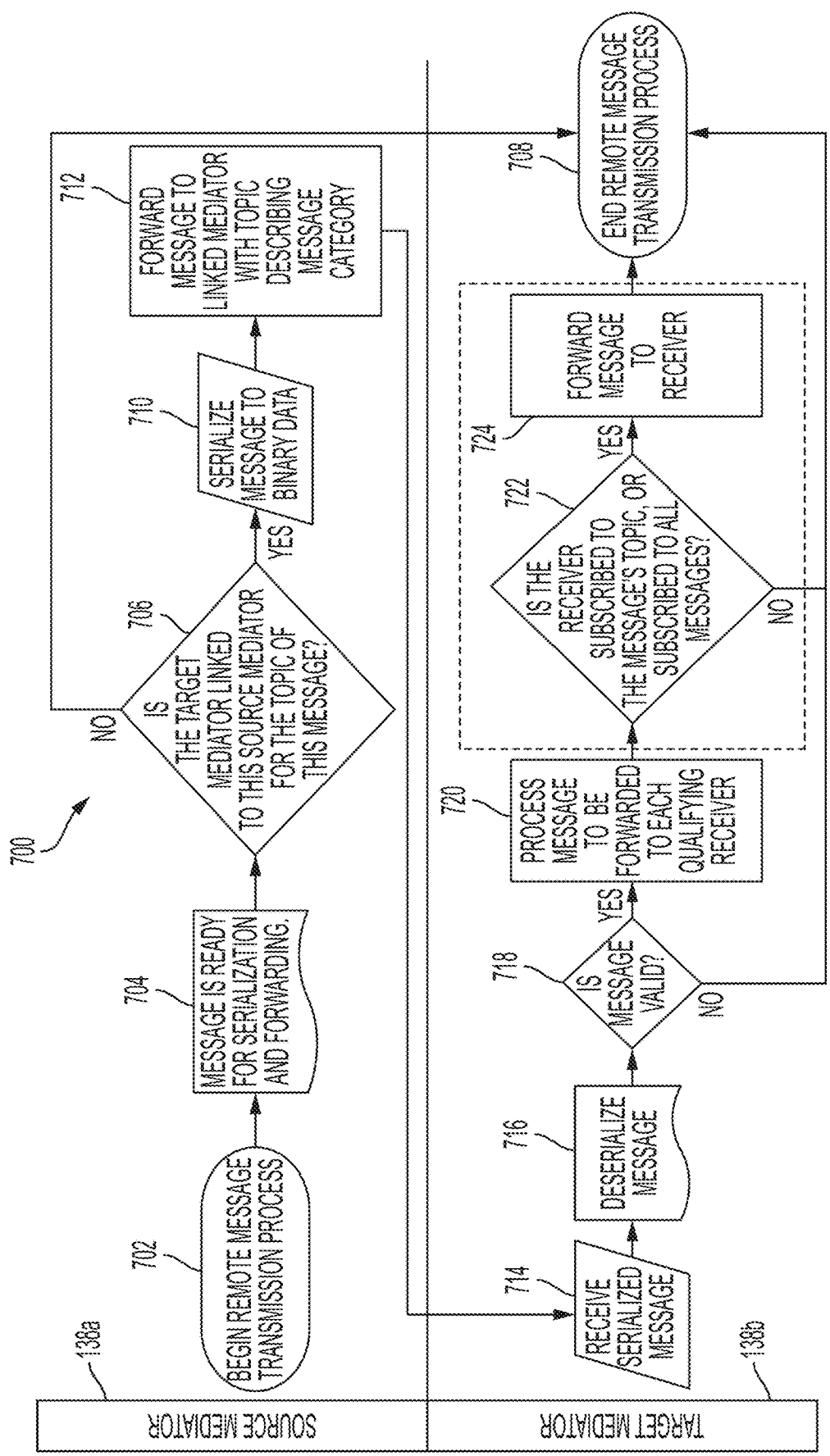
FIG. 7 is a flowchart of an example process for transmitting a remotely produced message to a target mediator computing device according to some aspects.

FIG. 7 is a flowchart of an example process 700 for transmitting a remotely produced message from a source mediator computing device (e.g., the mediator computing device 138a) to a target mediator computing device (e.g., the mediator computing device 138b). At block 702, the process 700 involves beginning the remote message transmission process 700. For example, the source mediator computing device may receive an indication that the target mediator computing device is looking for data channeled through the source mediator computing device. In another example, the process 700 may initialize as soon as the source mediator computing device creates a communication link with the target mediator computing device.

At block 704, the process 700 involves the source mediator computing device receiving a message that is ready for serialization and forwarding to the target mediator computing device. At block 706, a determination is made as to whether the target mediator computing device is linked to the source mediator computing device for the topic of the message. If the target mediator computing device is not linked for the topic of the message, the process 700 may end at block 708.

If the target mediator device is linked for the topic of the message, at block 710, the process 700 involves the source mediator computing device serializing the message to binary data to prepare the message for transmission to the target mediator computing device. At block 712, the serialized message is forwarded to the linked target mediator computing device along with a topic that describes a category of the message.

At block 714, the process 700 involves the target mediator computing device receiving the serialized message from the source mediator computing device. Further, at block 716, the target mediator computing device unpacks the message by deserializing the serialized message. Using the deserialized message, the target mediator computing device makes a determination, at block 720, regarding whether the message is valid. For example, the target mediator computing device may determine that the message is somehow corrupted or is missing necessary elements for transmission of the message to the other wellbore operation controllers in communication with the target mediator computing device. If the message is not valid, the process 700 may end at block 708.

If the message is valid, at block 720, the process 700 involves processing the message to be forwarded to each qualifying receiver in communication with the target mediator computing device. The qualifying receivers may be, for example, the wellbore operation controllers 210b or 216b of FIG. 2 that are subscribed to a type of data included within the message from the source mediator computing device. Further, processing the message may be an indication that the message was not discarded, and the message is available for forwarding to receivers in communication with the mediator computing device 138.

At block 722, the process 700 involves determining if each of the receivers in communication with the target mediator computing device is subscribed to the message's topic or subscribed to all messages from the target mediator computing device. If a receiver is not subscribed to the message's topic or to all messages from the target mediator computing device, the process 700 may end at block 708.

If the receiver is subscribed to the message's topic or to all messages from the mediator computing device 138, at block 724, the process 700 involves forwarding the message to each of the subscribed receivers. Once the message is forwarded to the subscribed receivers, the process 700 may end at block 708.

Figure 8:
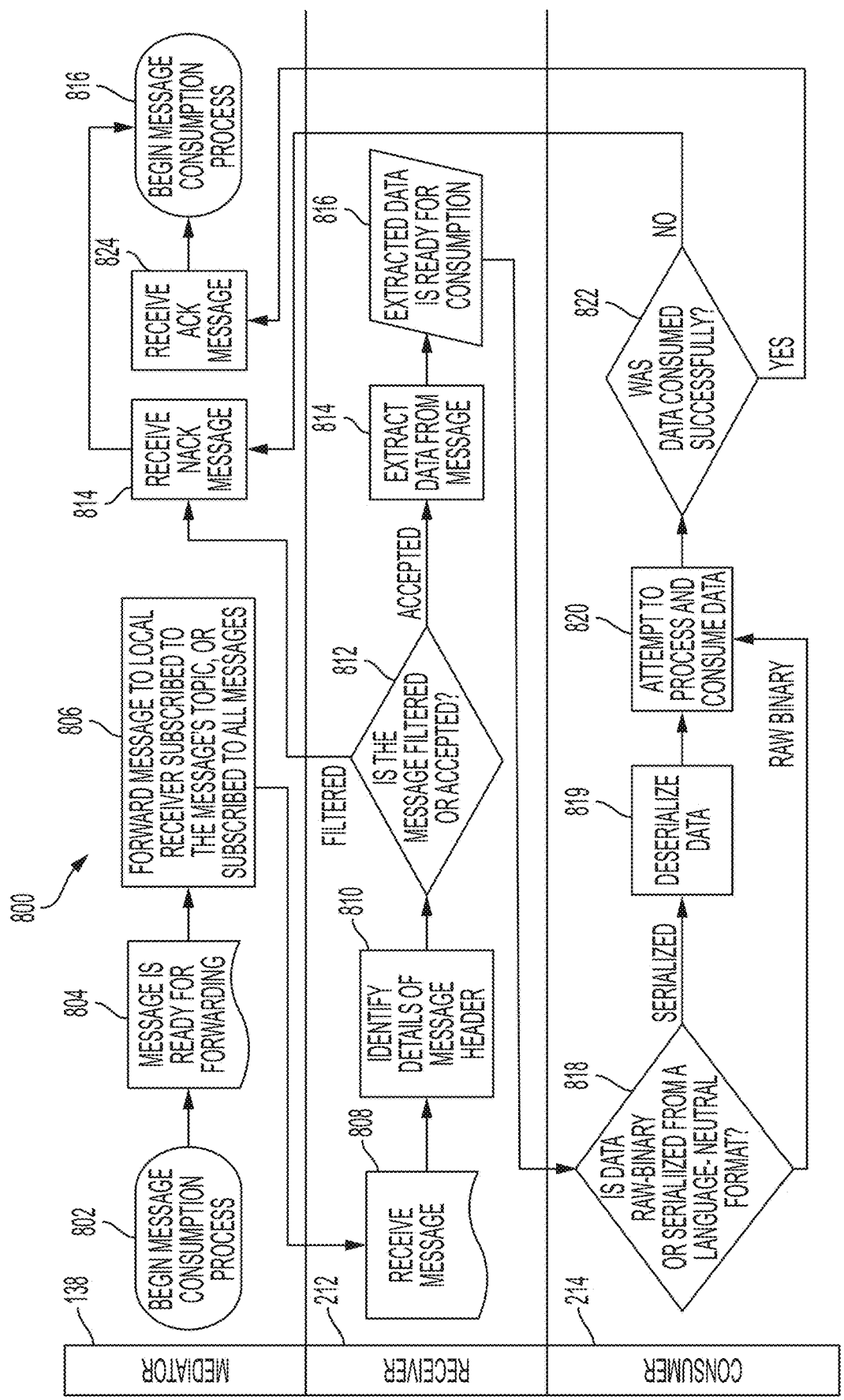
FIG. 8 is a flowchart of an example process for transmitting a message from the mediator computing device of FIG. 1 to a data consumer according to some aspects.

FIG. 8 is a flowchart of an example process 800 for transmitting a message from a mediator computing device (e.g., the mediator computing device 138) to a data consumer (e.g., the wellbore operation controller 210 including the message receiver component 212 and the data consumer component 214). At block 802, the process 800 involves beginning the message consumption process 800. For example, the mediator computing device may receive an indication that the data consumer is looking for data channeled through the mediator computing device. In another example, the process 800 may initialize as soon as the mediator computing device creates a communication link with the data consumer.

At block 804, the process 800 involves ensuring that the message is prepared for forwarding to the data consumer. Further, at block 806, the process 800 involves forwarding the message to a data consumer local to the mediator computing device. In an example, the message is only forwarded to the data consumers that are subscribed to a topic of the message or subscribed to all of the messages channeled through the mediator computing device.

At block 808, the process 800 involves receiving the message at a message receiver component (e.g., the message receiver component 212) of the data consumer. In an example, the mediator computing device may be integral to the data consumer, may be located within a separate wellbore operation controller, or may be a standalone device. In one or more examples, the mediator computing device may transmit the message to the data consumer through a wired or wireless connection.

At block 810, the process 800 involves identifying details of a message header of the message received at the data consumer. The details of the message header may provide the data consumer with information usable to determine if the message is useful to the data consumer. For example, the data consumer may filter out messages that are unusable by the data consumer to improve performance of an operation of the data consumer.

At block 812, the process 800 involves making a determination as to whether the message is filtered or accepted. If the message is not relevant to the data consumer, a determination is made to filter the message. When the message is filtered by the data consumer, the mediator computing device may receive a non-acknowledgement message, at block 814, indicating that the message was not accepted by the data consumer. Upon receiving the non-acknowledgement message, the mediator computing device may make a note to cease future transmissions of messages with the same topic to the data consumer. Additionally, upon receiving the non-acknowledgement message at the mediator computing device, the process 800 may end at block 816.

If, at block 812, the message is accepted, then at block 814, the process 800 involves extracting data from the message. For example, the header information may be removed from the message envelope such that only the data remains. Once the data is extracted, at block 816, the process 800 involves establishing that the data is ready for consumption. Establishing that the data is ready for consumption may involve transitioning the data from the message receiver component 212 to the data consumer component 214.

Accordingly, at block 818, the process 800 involves determining whether the data extracted from the message is in raw binary form or serialized from a programming language-neutral format. Upon determining that the data is serialized, at block 819, the process 800 involves deserializing the data prior to processing and consuming the data. After deserializing the data or after determining that the data is in raw binary form, at block 820, the process 800 involves attempting to process and consume the data. The data may be processed differently depending on the format of the data. For example, the data in the raw binary form may need further processing to generate data usable to the data consumer. In some examples, the data consumer component 214 may not be able to process and consume data in the raw binary form. Additionally, the serialized data from a programming language-neutral format may generally rely on less processing for the data to be usable by the data consumer.

At block 822, the process 800 involves making a determination as to whether the data was consumed successfully by the data consumer. In an example, the data consumer may provide an indication to the mediator computing device that the data was not consumed using a non-acknowledgement message at block 814. If the data was consumed, the data consumer may provide an indication to the mediator computing device that the data was consumed using an acknowledgement message at block 814. In either instance, the process 800 may end at block 818 upon providing the acknowledgement or non-acknowledgement message to the mediator computing device.

Figure 9:
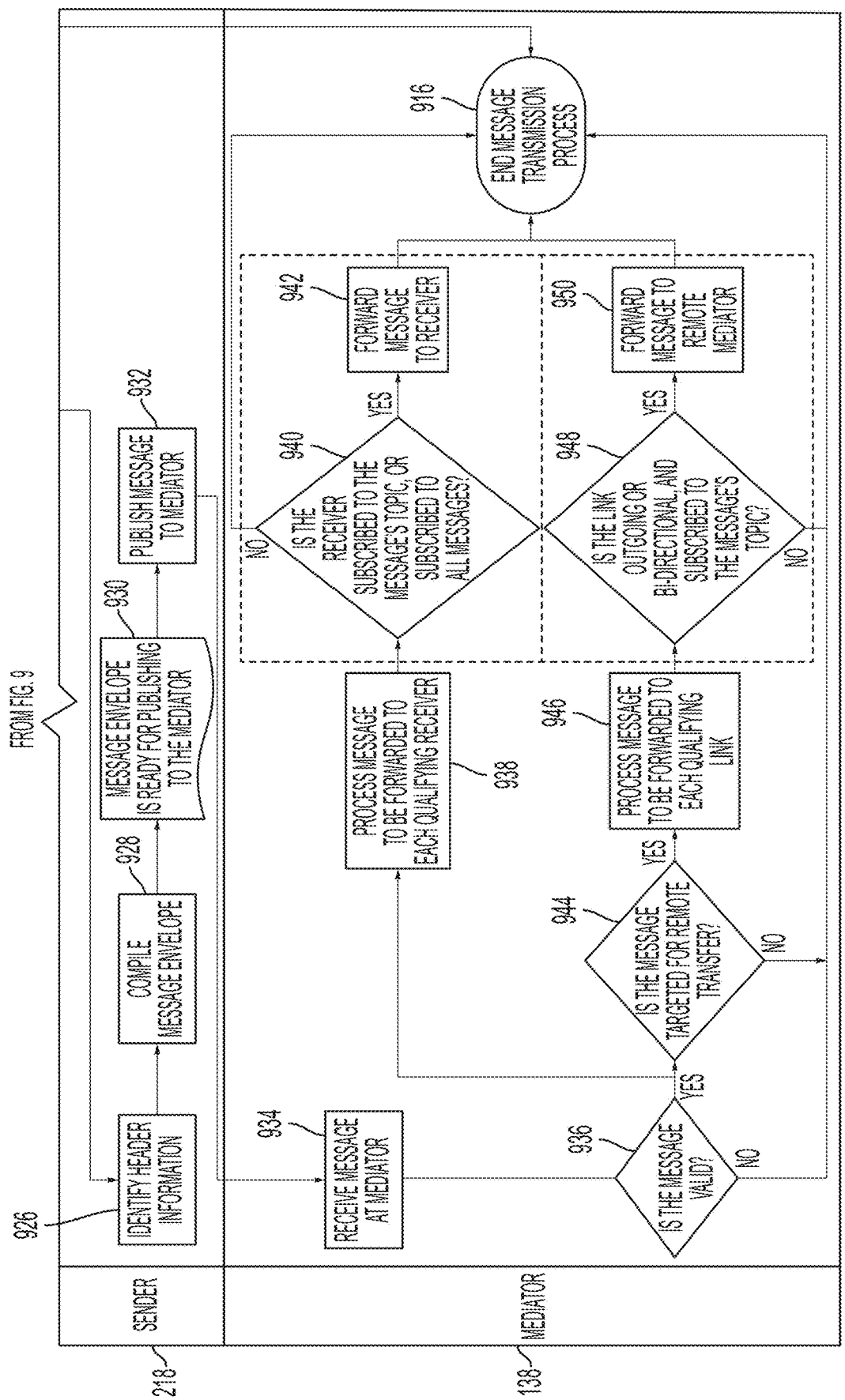
FIG. 9 is a flowchart of an example process for a transformation of a message according to some aspects.

FIG. 9 is a flowchart of an example process for a transformation of a message at a data transformer (e.g., the wellbore operation controller 216). At block 902, the process 900 involves beginning the message transformation process 900. For example, a mediator computing device (e.g., the mediator computing device 138) may receive an indication that the data transformer is looking for data channeled through the mediator computing device. In another example, the process 900 may initialize as soon as the mediator computing device creates a communication link with the data transformer.

At block 904, the process 900 involves ensuring that the message is prepared for forwarding to the data consumer. Further, at block 906, the process 900 involves forwarding the message to the data transformer local to the mediator computing device. In an example, the message is only forwarded to the data consumers that are subscribed to a topic of the message or subscribed to all of the messages channeled through the mediator computing device.

At block 908, the process 900 involves receiving the message at a message receiver component (e.g., the message receiver component 220) of the data transformer (e.g., the wellbore operation controller 216). In an example, the mediator computing device may be integral to the data transformer, may be located within a separate wellbore operation controller, or may be a standalone device. In one or more examples, the mediator computing device may transmit the message to the data transformer through a wired or wireless connection.

At block 910, the process 900 involves identifying details of a message header of the message received at the data transformer. The details of the message header may provide the data transformer with information usable to determine if the message is useful to the operations of the data transformer. For example, the data transformer may filter out messages that are unusable by the data transformer to perform transformation operations on the data.

At block 912, the process 900 involves making a determination as to whether the message is filtered or accepted. If the message is not relevant to the data transformer, a determination is made to filter the message. When the message is filtered by the data transformer, the mediator computing device may receive a non-acknowledgement message, at block 914, indicating that the message was not accepted by the data transformer. Upon receiving the non-acknowledgement message, the mediator computing device may make a note to cease future transmissions of messages with the same topic to the data transformer. Additionally, upon receiving the non-acknowledgement message at the mediator computing device, the process 900 may end at block 916.

If, at block 912, the message is accepted by the data transformer, then, at block 916, the process 900 involves extracting data from the message. For example, the header information may be removed from the message envelope such that only the data remains. Once the data is extracted, at block 918, the process 900 involves establishing that the data is ready for consumption. Establishing that the data is ready for consumption may involve transitioning the data from the message receiver component 220 to a data transformer component.

Accordingly, at block 920, the process 900 involves determining whether the data extracted from the message is in raw binary form or serialized from a programming language-neutral format. Upon determining that the data is serialized, at block 921, the process 900 involves deserializing the data prior to processing and transforming the data. After deserializing the data, or after determining that the data is in raw binary form, at block 922, the process 900 involves attempting to process and transform the data. The data may be processed differently depending on the format of the data. For example, the data in the raw binary form may need further processing to generate data usable to the data transformer. In some examples, the data transformer may not be able to process and consume data in the raw binary form. Additionally, the data from a programming language-neutral format may generally rely on less processing for the data to be usable by the data consumer due to the data being in the programming language-neutral format.

At block 923, the process 900 involves making a determination as to whether the data was transformed successfully by the data transformer. In an example, the data transformer may provide an indication to the mediator computing device that the data was not transformed using a non-acknowledgement message at block 914, and the process may end at block 916 upon receipt of the non-acknowledgement message. If the data was transformed, at block 924, the process 900 involves providing an indication to the message sender component (e.g., the message sender component 218) of the data transformer that the transformed data is prepared for inclusion in a new message.

At block 926, the process 900 involves identifying, at the message sender component, header information for the transformed data. The header information may describe, for example, what information the transformed data represents (e.g., microseismic acoustic data, hydraulic pumping telemetry, etc.) and the origination of the data (e.g., the well identifier, the equipment serial number, the probe identifier, etc.).

At block 928, the process 900 involves compiling a message envelope. The message envelope may include the header information combined with the transformed data. Upon compiling the message envelope, the message envelope is ready, at block 930, for publishing to the mediator computing device. Thus, at block 932, the process 900 involves publishing the message (i.e., the message envelope) to the mediator computing device.

At block 934, the process 900 involves receiving the message at the mediator computing device (e.g., the mediator computing device 138 of FIG. 1). As discussed above, the mediator computing device may be integral to the wellbore operation controller 216, may be located within a separate wellbore operation controller 204 or 210, or may be a standalone device. The message sender component may transmit the message to the mediator computing device through a wired or wireless connection.

At block 936, the process 900 involves making a determination as to whether the message is valid. For example, the mediator computing device may determine that the message is somehow corrupted or is missing necessary elements for transmission of the message to other wellbore operation controllers. If the message is not valid, the message transmission process ends at block 916.

If the message received by the mediator computing device is valid, at block 938, the process 900 involves processing the message to be forwarded to each qualifying receiver. The qualifying receivers may be, for example, the wellbore operation controllers 204 or 210 that are subscribed to a type of data included within the message from the data transformer. Further, processing the message may be an indication that the message was not discarded, and the message is available for forwarding to receivers in communication with the mediator computing device 138.

At block 940, the process 900 involves determining if each of the receivers in communication with the mediator computing device is subscribed to the message's topic or subscribed to all messages from the mediator computing device. If a receiver is not subscribed to the message's topic or to all messages from the mediator computing device, the process 900 may end at block 916.

If the receiver is subscribed to the message's topic or to all messages from the mediator computing device, at block 942, the process 900 involves forwarding the message to each of the subscribed receivers. Once the message is forwarded to the subscribed receivers, the process 900 may end at block 916.

At block 944, the process 900 involves determining if the message is targeted for remote transfer. For example, the message may be targeted for transmission to one or more remote mediator computing devices. If the message is not targeted for transfer to a remote mediator computing device, the process 900 may end at block 916.

If the message is targeted for transfer to a remote mediator computing device, at block 946, the process 900 involves processing the message to be forwarded to each qualifying link to other remote mediator computing devices. The remote mediator computing devices receiving the message may be, for example, the remote mediator computing devices in communication with remote wellbore controllers that are subscribed to a type of data included within the message from the data transformer. Further, processing the message may be an indication that the message was not discarded, and the message is available for forwarding to remote mediator computing devices subscribed to the topic of the message.

At block 948, the process 900 involves determining if the link is outgoing or bi-directional and subscribed to the message's topic. If the link is not outgoing or bi-directional or not subscribed to the message's topic, the process 900 may end at block 916. If the link is outgoing or bi-directional and subscribed to the message's topic, at block 950, the message is forwarded using each of the qualifying links to the remote mediator computing devices. Upon completion of forwarding the message to the qualifying links, the process 900 may end at block 916.

Figure 10:
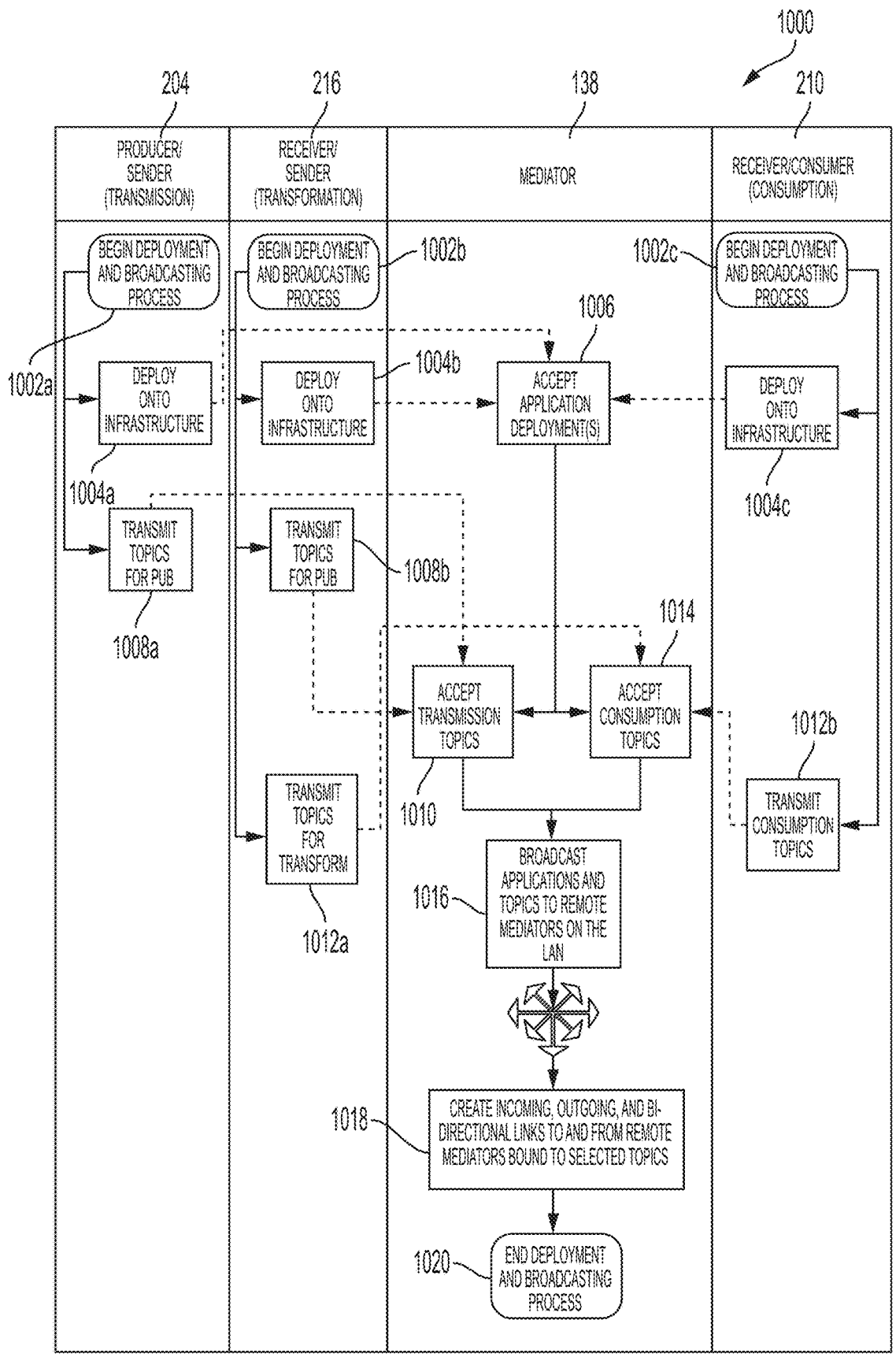
FIG. 10 is a flowchart of an example process for broadcasting a message from a local mediator computing device to other mediator computing devices according to some aspects.

FIG. 10 is a flowchart of an example process 1000 for broadcasting a message from a local mediator computing device (e.g., the mediator computing device 138*a*) to other remote mediator computing devices (e.g., the mediator computing device 138*b*). Initially, at blocks 1002*a*, 1002*b*, and 1002*c*, the process 1000 involves the wellbore operation controllers 204, 216, and 210 each beginning the deployment and broadcasting process 1000. In the process 1000, each of the wellbore operation controllers 204 (e.g., a data producer), 216 (e.g., a data transformer), and 210 (e.g., a data consumer) provides indications to a local mediator computing device (e.g., the mediator computing device 138) of a type of topics transmitted or consumed by the wellbore operation controllers 204, 216, and 210.

At blocks 1004a, 1004b, and 1004c, the process 1000 involves the wellbore operation controllers 204, 216, and 210 deploying onto the infrastructure of the mediator computing device 138. For example, the wellbore operation controllers 204, 216, and 210 provide indications of intent to transmit data to other devices as mediator applications through the mediator computing device 138. At block 1006, the process 1000 involves the mediator computing device 138 accepting the mediator application deployments of the wellbore operation controllers 204, 216, and 210.

At blocks 1008a and 1008b, the process 1000 involves the wellbore operation controllers 204 and 216 transmitting indications of topics for publication at the mediator computing device 138. In an example, the topics for publication provided by the wellbore operation controllers 204 and 216 provide an indication of the type of data produced or transformed by the wellbore operation controllers 204 and 216. This information may be used to generate links between mediator computing devices. At block 1010, the process 1000 involves the mediator computing device 138 accepting the transmission topics from the wellbore operation controllers 204 and 216.

At blocks 1012a, the process 1000 involves the wellbore operation controller 216 transmitting indications of topics of data that the wellbore operation controller 216 is able to transform. Similarly, at block 1012b, the process 1000 involves the wellbore operation controller 210 transmitting indications of topics of data that the wellbore operation controller 210 is able to consume. At block 1014, the process 1000 involves the mediator computing device 138 accepting the transformation and consumption topics from the wellbore operation controllers 216 and 210.

At block 1016, the process 1000 involves the mediator computing device broadcasting the mediator applications and topics for publication, transformation, and consumption to remote mediator computing devices across a local area network. Based on the broadcast mediator applications and topics, at block 1018, the process 1000 involves creating incoming, outgoing, and bi-directional links to and from the remote mediator computing devices that are bound to the topics transmitted by the mediator computing device 138. Upon creating the links between the mediator computing device 138 and the remote mediator computing devices, the process 1000 may end at block 1020.

Figure 11:
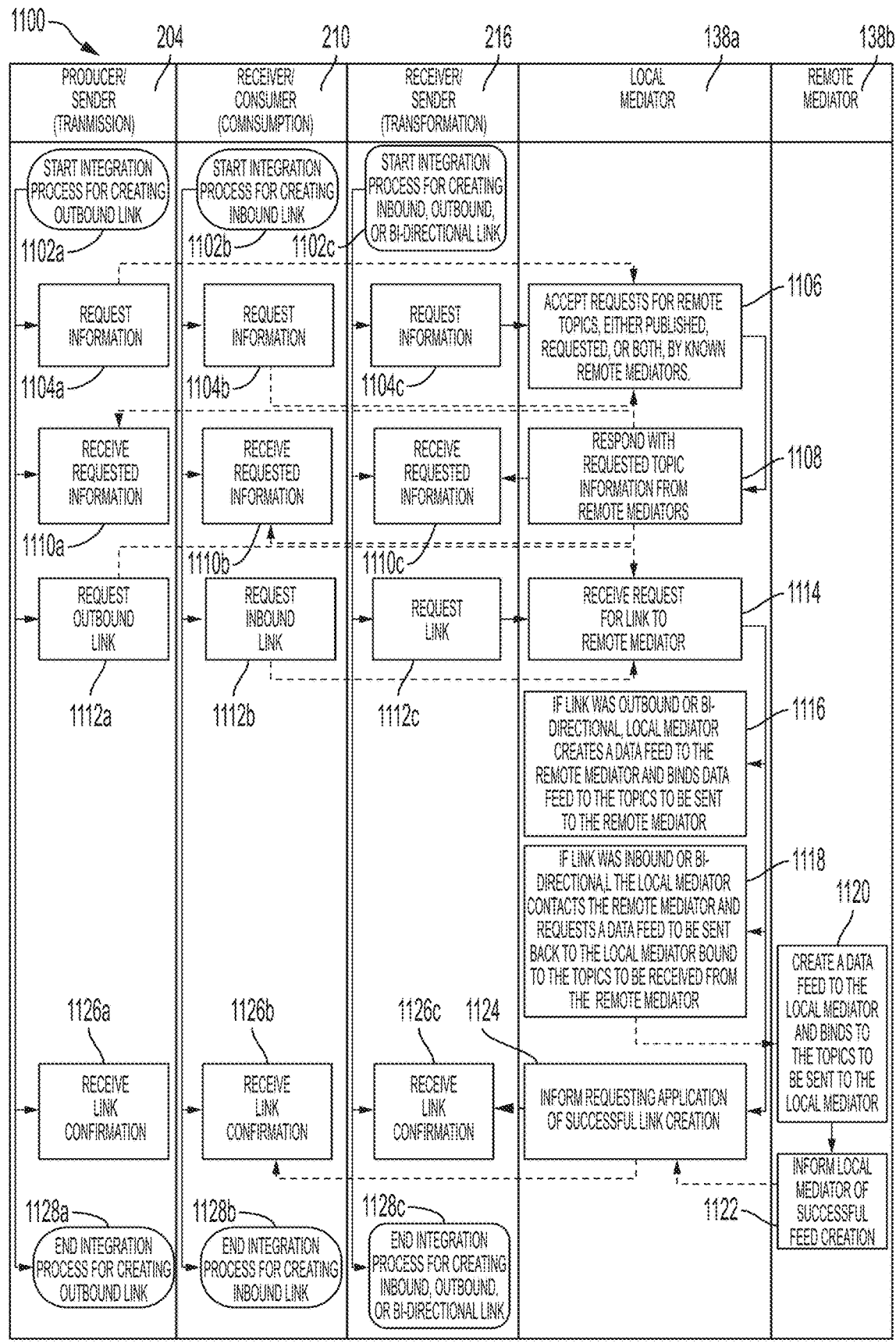
FIG. 11 is a flowchart of an example process for generating a link between a local mediator computing device and a remote mediator computing device according to some aspects.

FIG. 11 is a flowchart of an example process 1100 for generating a link between a local mediator computing device 138a and a remote mediator computing device 138b. At blocks 1102a, 1102b, and 1102c, the process 1100 involves the wellbore operation controllers 204, 210, and 216 starting the process 1100 for creating links with the remote mediator computing device 138b. The links created by the process 1100 with the remote mediator computing device 138b may provide a path for data exchange between the local mediator computing device 138a and the remote mediator computing device 138b.

At blocks 1104a, 1104b, and 1104c, the process 1100 involves the wellbore operation controllers 204, 210, and 216 requesting information on data topics that the wellbore operation controllers 204, 210, and 216 are able to generate, consume, or transform. For example, the wellbore operation controller 204 (e.g., a data producer) may request information about topics that are requested for consumption from the remote mediator computing device 138b. The wellbore operation controller 210 (e.g., a data consumer) may request information about topics that the wellbore operation controller 210 would like to consume from the remote mediator computing device 138b. Further, the wellbore operation controller 216 (e.g., a data transformer) may request information about topics that are requested for consumption from the remote mediator computing device 138b and the topics that the wellbore operation controller 216 would like to consume from the remote mediator computing device 138b.

At block 1106, the process 1100 involves accepting requests for the remote topics that are published, requested, or both to and from the remote mediator computing device or devices 138b. Based on these accepted requests, at block 1108, the process 1100 involves the remote mediator computing device 138a responding with the requested topic information from the remote mediator computing devices 138b, and, at blocks 1110a, 1110b, and 1110c, the process 1100 involves receiving the requested topic information at the wellbore operation controllers 204, 210, and 216. The requested topic information may include topics of data that the remote mediator computing devices 138b would like to receive from the local mediator computing device 138a and topics of data that the remote mediator computing devices 138b are able to provide the local mediator computing device 138a.

Based on the requested topic information received at the wellbore operation controller 204, at block 1112a, the process 1100 involves requesting an outbound link to the remote mediator computing device 138b. Based on the requested topic information received at the wellbore operation controller 210, at block 1112b, the process 1100 involves requesting an inbound link from the remote mediator computing device 138b. Further, based on the requested topic information received at the wellbore operation controller 216, at block 1112c, the process 1100 involves requesting an inbound link, an outbound link, or a bi-directional link with the remote mediator computing device 138b. The requested links between the local mediator computing device 138a and the remote mediator computing device 138b may facilitate the data transmission, data consumption, and data transformation processes of the wellbore operation controllers 204, 210, and 216 by providing access to additional streams of data from the remote mediator computing device 138b. At block 1114, the process 1100 involves receiving, at the local mediator computing device 138a, the requests for the links to the remote mediator computing device or devices 138b from the wellbore operation controllers 204, 210, and 216.

At block 1116, the process 1100 involves the local mediator computing device 138a creating a data feed to the remote mediator computing device or devices 138b and binding the data feed to the topics to be sent to the remote mediator computing devices 138b. Such a link may be generated when the requested link from one or more of the wellbore operation controllers (e.g., a data producer, a data transformer, or both) is an outbound or bi-directional link.

At block 1118, the process 1100 involves the local mediator computing device 138a contacting the remote mediator computing device or devices 138b to request a data feed bound to the topics to be sent to the local mediator computing devices 138a. Such a link may be requested when the requested link from one or more of the wellbore operation controllers (e.g., a data consumer, a data transformer, or both) is an inbound or bi-directional link.

At block 1120, the process 1100 involves creating, at the remote mediator computing device 138b a data feed link to the local mediator computing device 138a. The remote mediator computing device 138b may also bind the data feed to the topics to be sent to the local mediator computing device 138a. At block 1122, the process 1100 involves informing the local mediator computing device 138a of the successful data feed creation.

At block 1124, the process 1100 involves the local mediator computing device 138a informing the wellbore operation controllers 204, 210, and 216 (e.g., the requesting applications) of the successful data feed link creation with the remote mediator computing device 138b. At blocks 1126a, 1126b, and 1126c, the process 1100 involves receiving the data feed link confirmation at the wellbore operation controllers 204, 210, and 216. Upon receiving the data feed link confirmation at the wellbore operation controllers 204, 210, and 216, the process 1100 may end at block 1128a, 1128b, and 1128c.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

In some aspects, systems, devices, and methods for operating wellbore equipment using a data-driven physics-based process are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a first wellbore operation controller for controlling a wellbore operation and for generating a first broadcast indicating a first data topic desired for controlling the wellbore operation; a second wellbore operation controller for generating a data stream of data associated with a wellbore and for generating a second broadcast indicating a second data topic that promotes the data of the data stream; and a mediator computing device positionable to: receive the first broadcast from the first wellbore operation controller and the second broadcast from the second wellbore operation controller; determine that the first wellbore operation controller is subscribed to the data stream of the second wellbore operation controller by comparing the first data topic to the second data topic; and in response to determining that the first wellbore operation controller is subscribed to the data stream of the second wellbore operation controller, create a data link between the first wellbore operation controller and the second wellbore operation controller to provide the data associated with the wellbore to the first wellbore operation controller.

Example 2 is the system of example 1, wherein the first wellbore operation controller adjusts the wellbore operation based on the data associated with the wellbore received from the second wellbore operation controller.

Example 3 is the system of examples 1-2, wherein the wellbore operation comprises forming a wellbore, stimulating the wellbore, or producing fluid from the wellbore.

Example 4 is the system of examples 1-3, wherein the data associated with the wellbore is transformed into a programming language-neutral format prior to providing the data associated with the wellbore to the first wellbore operation controller.

Example 5 is the system of example 4, wherein the data associated with the wellbore comprises microseismic acoustic data and the wellbore operation comprises a hydraulic fracturing operation.

Example 6 is the system of examples 1-5, wherein the mediator computing device is further positionable to: create an additional data link between the second wellbore operation controller and a third wellbore operation controller, wherein the data associated with the wellbore comprises transformed data, and wherein the second wellbore operation controller transforms source data originating from the third wellbore operation controller to generate the transformed data.

Example 7 is the system of examples 1-6, wherein the mediator computing device is further positionable to connect with additional wellbore operation controllers in a pluggable manner without recompiling a base stack of a stack data structure of the mediator computing device.

Example 8 is the system of examples 1-7, wherein the mediator computing device is further positionable to connect with remote mediator computing devices by creating remote data links between the mediator computing device and the remote mediator computing devices to provide additional data streams from the remote mediator computing device to the first wellbore operation controller or the second wellbore operation controller.

Example 9 is a method comprising: transmitting, to a mediator computing device, a first broadcast indicating a first data topic desired for controlling an operation associated with forming a well, stimulating a wellbore, or producing fluid from the wellbore; receiving a message from the mediator computing device originating from a data producer; determining that the message is filtered or accepted; in response to determining that the message is filtered, discarding the message; in response to determining that the message is accepted: extracting data from the message; processing and consuming the data; and adjusting an equipment control process using the data.

Example 10 is the method of example 9, wherein the equipment control process comprises forming the wellbore, stimulating the wellbore, or producing the fluid from the wellbore.

Example 11 is the method of examples 9-10, wherein the data of the message is transformed into a programming language-neutral format prior to receiving the message from the mediator computing device.

Example 12 is the method of example 9-11, wherein the data extracted from the message comprises microseismic acoustic data and the equipment control process comprises a hydraulic fracturing operation.

Example 13 is the method of examples 9-12, further comprising: receiving an additional message from the mediator computing device originating from an additional data producer; determining if the additional message is filtered or accepted; if the additional message is accepted, extracting additional data from the additional message; processing and consuming the additional data; and adjusting the equipment control process using the data and the additional data.

Example 14 is the method of examples 9-13, further comprising: communicatively connecting with the mediator computing device in a pluggable manner without recompiling a base stack of a stack data structure of the mediator computing device.

Example 15 is a non-transitory computer-readable medium that includes instructions that are executable by a processing device to perform operations controlling equipment associated with a wellbore, the operations comprising: transmitting, to a mediator computing device, a first broadcast indicating a first data topic desired for controlling an operation associated with forming a well, stimulating a wellbore, or producing fluid from the wellbore; receiving a message from the mediator computing device originating from a data producer; determining that the message is filtered or accepted; in response to determining that the message is accepted, extracting data from the message; processing and consuming the data; and adjusting an equipment control process using the data.

Example 16 is the non-transitory computer-readable medium of example 15, wherein the equipment control process comprises forming the wellbore, stimulating the wellbore, or producing the fluid from the wellbore.

Example 17 is the non-transitory computer-readable medium of examples 15-16, wherein the data producer comprises a remote mediator computing device linked with the mediator computing device.

Example 18 is the non-transitory computer-readable medium of examples 15-17, the operations further comprising: filtering the message when a second data topic from a message header of the message does not match the first data topic of the first broadcast.

Example 19 is the non-transitory computer-readable medium of example 15-18, the operations further comprising: communicatively connecting with the mediator computing device in a pluggable manner without recompiling a base stack of a stack data structure of the mediator computing device.

Example 20 is the non-transitory computer-readable medium of example 15-19, the operations further comprising: receiving an additional message from the mediator computing device originating from an additional data producer; determining if the additional message is filtered or accepted; if the additional message is accepted, extracting additional data from the additional message; processing and consuming the additional data; and adjusting the equipment control process using the data and the additional data.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a first wellbore operation controller for controlling a wellbore operation performed with respect to a first wellbore and for generating a first broadcast indicating a first data topic desired for controlling the wellbore operation;
a second wellbore operation controller for generating a data stream of data associated with a second wellbore and for generating a second broadcast indicating a second data topic that promotes the data of the data stream; and
a mediator computing device positionable to:
receive the first broadcast from the first wellbore operation controller and the second broadcast from the second wellbore operation controller;
determine that the first wellbore operation controller is subscribed to the data stream of the second wellbore operation controller by comparing the first data topic to the second data topic; and
in response to determining that the first wellbore operation controller is subscribed to the data stream of the second wellbore operation controller, create a data link between the first wellbore operation controller and the second wellbore operation controller to provide the data associated with the second wellbore to the first wellbore operation controller, wherein the data associated with the second wellbore comprises micro-seismic acoustic data and is transformed into a programming language-neutral format prior to providing the data associated with the second wellbore to the first wellbore operation controller, wherein the first wellbore operation controller adjusts an equipment control process of the wellbore operation using the data associated with the second wellbore received from the second wellbore operation controller, and wherein the equipment control process comprises forming the first wellbore, stimulating the first wellbore, or producing fluid from the first wellbore and the wellbore operation comprises a hydraulic fracturing operation.

2. The system of claim 1, wherein the mediator computing device is further positionable to:
create an additional data link between the second wellbore operation controller and a third wellbore operation controller, wherein the data associated with the second wellbore comprises transformed data, and wherein the second wellbore operation controller transforms source data originating from the third wellbore operation controller to generate the transformed data.

3. The system of claim 1, wherein the mediator computing device is further positionable to connect with additional wellbore operation controllers in a pluggable manner without recompiling a base stack of a stack data structure of the mediator computing device.

4. The system of claim 1, wherein the mediator computing device is further positionable to connect with remote mediator computing devices by creating remote data links between the mediator computing device and the remote mediator computing devices to provide additional data streams from the remote mediator computing device to the first wellbore operation controller or the second wellbore operation controller.

5. A method comprising:
transmitting, by a wellbore operation controller and to a mediator computing device, a first broadcast indicating a first data topic desired for controlling a wellbore operation performed with respect to a well;
receiving a message from the mediator computing device originating from a data producer, wherein the data producer generates a data stream associated with a second data topic, and wherein the mediator computing device (i) determines that the wellbore operation controller is subscribed to the data stream of the data producer by comparing the first data topic to the second data topic, (ii) generates a data link between the wellbore operation controller and the data producer in response to determining that the wellbore operation controller is subscribed to the data stream of the data producer, and (iii) provides the message to the wellbore operation controller using the data link;
determining that the message is filtered or accepted;
in response to determining that the message is filtered, discarding the message;
in response to determining that the message is accepted:
extracting data from the message;
processing and consuming the data; and
adjusting an equipment control process using the data, wherein the data comprises micro-seismic acoustic data, the wellbore operation comprises a hydraulic fracturing operation, and wherein the equipment control process comprises forming the well, stimulating the well, or producing fluid from the well.

6. The method of claim 5, wherein the data of the message is transformed into a programming language-neutral format prior to receiving the message from the mediator computing device.

7. The method of claim 5, further comprising:
receiving an additional message from the mediator computing device originating from an additional data producer;
determining if the additional message is filtered or accepted;
if the additional message is accepted, extracting additional data from the additional message;
processing and consuming the additional data; and
adjusting the equipment control process using the data and the additional data.

8. The method of claim 5, further comprising:
communicatively connecting with the mediator computing device in a pluggable manner without recompiling a base stack of a stack data structure of the mediator computing device.

9. A non-transitory computer-readable medium that includes instructions that are executable by a processing device to perform operations controlling equipment associated with a wellbore, the operations comprising:
transmitting, via a wellbore operation controller and to a mediator computing device, a first broadcast indicating a first data topic desired for controlling a wellbore operation performed with respect to a well;
receiving a message from the mediator computing device originating from a data producer, wherein the data producer generates a data stream associated with a second data topic, and wherein the mediator computing device (i) determines that the wellbore operation controller is subscribed to the data stream of the data producer by comparing the first data topic to the second data topic, (ii) generates a data link between the wellbore operation controller and the data producer in response to determining that the wellbore operation controller is subscribed to the data stream of the data producer, and (iii) provides the message to the wellbore operation controller using the data link;
determining that the message is filtered or accepted;
in response to determining that the message is accepted, extracting data from the message;
processing and consuming the data; and
adjusting an equipment control process using the data, wherein the data comprises micro-seismic acoustic data, the wellbore operation comprises a hydraulic fracturing operation, and wherein the equipment control process comprises forming the well, stimulating the well, or producing fluid from the well.

10. The non-transitory computer-readable medium of claim 9, wherein the data producer comprises a remote mediator computing device linked with the mediator computing device.

11. The non-transitory computer-readable medium of claim 9, the operations further comprising:
filtering the message when a third data topic from a message header of the message does not match the first data topic of the first broadcast.

12. The non-transitory computer-readable medium of claim 9, the operations further comprising:
communicatively connecting with the mediator computing device in a pluggable manner without recompiling a base stack of a stack data structure of the mediator computing device.

13. The non-transitory computer-readable medium of claim 9, the operations further comprising:
receiving an additional message from the mediator computing device originating from an additional data producer;
determining if the additional message is filtered or accepted;
if the additional message is accepted, extracting additional data from the additional message;
processing and consuming the additional data; and adjusting the equipment control process using the data and the additional data.

* * * * *